US008380158B2

(12) United States Patent
McCulloch

(10) Patent No.: US 8,380,158 B2
(45) Date of Patent: Feb. 19, 2013

(54) SYSTEM AND METHOD FOR VITAL COMMUNICATIONS CONNECTIVITY

(75) Inventor: Edward Archie McCulloch, Alexandria, VA (US)

(73) Assignee: Edward A. McCulloch, Alexandria, VA (US)

( * ) Notice: Subject to any disclaimer, the term of this patent is extended or adjusted under 35 U.S.C. 154(b) by 271 days.

(21) Appl. No.: 11/293,500

(22) Filed: Dec. 5, 2005

(65) Prior Publication Data

US 2006/0133582 A1    Jun. 22, 2006

Related U.S. Application Data

(60) Provisional application No. 60/633,692, filed on Dec. 6, 2004.

(51) Int. Cl.
*H04M 11/04* (2006.01)
*H04M 3/42* (2006.01)

(52) U.S. Cl. .................. 455/404.1; 455/414.1

(58) Field of Classification Search .............. 455/404.1, 455/404.2, 422.1, 426.1, 461; 379/45, 49, 379/221.08, 221.09, 221.12, 42
See application file for complete search history.

(56) References Cited

U.S. PATENT DOCUMENTS

| | | |
|---|---|---|
| 4,219,698 A | 8/1980 | Birilli et al. |
| 4,237,344 A | 12/1980 | Moore |
| 4,491,970 A | 1/1985 | LaWhite et al. |
| 4,510,350 A | 4/1985 | Wagner |
| 4,547,877 A | 10/1985 | Lehman et al. |
| 4,551,581 A | 11/1985 | Doughty |
| 4,567,323 A | 1/1986 | Lottes et al. |
| 4,582,956 A | 4/1986 | Doughty |
| 4,602,129 A | 7/1986 | Matthews et al. |
| 4,757,267 A | 7/1988 | Riskin |
| 4,881,252 A | 11/1989 | Jones et al. |
| 4,924,491 A | 5/1990 | Compton et al. |
| 5,161,180 A | 11/1992 | Chavous |
| 5,195,126 A | 3/1993 | Carrier et al. |
| 5,805,670 A | 9/1998 | Pons et al. |
| 5,864,755 A | 1/1999 | King et al. |
| 6,028,915 A | 2/2000 | McNevin |
| 6,151,385 A | 11/2000 | Reich et al. |
| 6,201,856 B1 | 3/2001 | Orwick |
| 6,243,442 B1 | 6/2001 | Tanaka et al. |
| 6,266,397 B1 | 7/2001 | Stoner |
| 6,295,346 B1 | 9/2001 | Markowitz et al. |
| 6,370,232 B1 | 4/2002 | Yrjana |
| 6,415,018 B1 | 7/2002 | Antonucci et al. |
| 6,427,001 B1 * | 7/2002 | Contractor et al. ............. 379/45 |
| 6,442,241 B1 | 8/2002 | Tsumpes |

(Continued)

OTHER PUBLICATIONS

Markus G. Kuhn, Compromising Emanations: Eavesdropping Risks of Computer Displays, *Technical Report* No. 577, University of Cambridge Computer Laboratory, UCAM-CL-TR-577, Dec. 2003, ISSN 1476-2986.

(Continued)

*Primary Examiner* — Brandon Miller
(74) *Attorney, Agent, or Firm* — Blank Rome LLP

(57) ABSTRACT

A communications system is disclosed that is capable of collecting, processing, and transmitting information signals over communications networks originating within the same or different communications networks, the communications system having a means for developing, identifying, and/or utilizing electronic trigger signals generated by calls initiated within a first communications network, a database for storing information related to the triggers and one or more users and information recipients, and a means for transmitting signals over the first communications network or over a second communications network to the recipients, wherein the signals contain information related to the triggers in order to allow recipients to act on the information.

44 Claims, 9 Drawing Sheets

U.S. PATENT DOCUMENTS

| | | | |
|---|---|---|---|
| 6,584,307 B1 | 6/2003 | Antonucci et al. | |
| 6,587,545 B1 | 7/2003 | Antonucci et al. | |
| 6,600,811 B1 | 7/2003 | Patel et al. | |
| 6,608,886 B1 | 8/2003 | Contractor | |
| 6,678,357 B2 | 1/2004 | Stumer et al. | |
| 6,690,932 B1 | 2/2004 | Barnier et al. | |
| 6,724,860 B2 | 4/2004 | Stumer et al. | |
| 6,731,625 B1 | 5/2004 | Eastep et al. | |
| 6,731,721 B2 | 5/2004 | Tanaka et al. | |
| 6,744,857 B2 | 6/2004 | Stumer et al. | |
| 6,760,762 B2 * | 7/2004 | Pezzutti | 709/223 |
| 6,771,742 B2 * | 8/2004 | McCalmont et al. | 379/45 |
| 6,792,081 B1 | 9/2004 | Contractor | |
| 6,819,929 B2 | 11/2004 | Antonucci et al. | |
| 6,882,718 B1 | 4/2005 | Smith | |
| 7,133,499 B2 * | 11/2006 | Winegarden | 379/45 |
| 7,212,111 B2 * | 5/2007 | Tupler et al. | 340/539.18 |
| 7,221,928 B2 * | 5/2007 | Laird et al. | 455/404.1 |
| 7,251,312 B2 * | 7/2007 | D'Evelyn et al. | 379/45 |
| 2002/0065063 A1 * | 5/2002 | Uhlik et al. | 455/404 |
| 2002/0101961 A1 | 8/2002 | Karnik et al. | |
| 2002/0177428 A1 * | 11/2002 | Menard et al. | 455/404 |
| 2004/0190497 A1 * | 9/2004 | Knox | 370/352 |
| 2005/0124316 A1 * | 6/2005 | Islam et al. | 455/404.2 |
| 2005/0282518 A1 * | 12/2005 | D'Evelyn et al. | 455/404.1 |

OTHER PUBLICATIONS

VoIP, Inc. Files Patent Application for 911 Emergency Life Line Technology; U.S. Department of Homeland Security (http://www.dhs.gov/dhspublic).

* cited by examiner

| COUNTRY / LOCATION | DIALING NUMBER FOR ACCESSING PSAP* |
|---|---|
| ARGENTINA | 101 |
| AUSTRALIA | 000 |
| BRAZIL | 190 |
| CANADA | 911 |
| COLUMBIA | 123 |
| DENMARK | 112 |
| FRANCE | 17 |
| GERMANY | 112 |
| GREECE | 100 |
| ICELAND | 0112 |
| ISRAEL | 100 |
| ITALY | 112 |
| JAMAICA | 119 |
| JAPAN | 110 |
| MEXICO | 08 |
| MOSCOW | 051 |
| NEW ZEALAND | 111 |
| PHILIPPINES | 117 |
| POLAND | 997 |
| ROMAINIA | 961 |
| SOUTH AFRICA | 112 |
| SPAIN | 532 |
| SWEDEN | 112 |
| THAILAND | 191 |
| UNITED KINGDOM | 999 |
| UNITED STATES | 911 |

*AS OF MARCH 2005; THIS IS A PARTIAL LIST

FIG. 3

SYSTEM AND METHOD FOR VITAL COMMUNICATIONS CONNECTIVITY

REFERENCE TO RELATED APPLICATION

The present application is related to U.S. Provisional Patent Application No. 60/633,692, entitled "911 Notification System," filed Dec. 6, 2004, the disclosure of which is incorporated by reference herein in its entirety.

BACKGROUND OF THE INVENTION

1. Field of Invention

The present invention relates generally to a system and method for receiving electronic signals and then using the electronic signals to automatically determine the need to execute an alertment protocol to coordinate the distribution of relevant information to pre-selected and/or designated information recipients. In particular, the present invention relates to a system and method for managing the convergence of requirements for individual, family, and organizational communications, including requirements for planning, creating, and monitoring vital, action-oriented information regarding the health and welfare of those persons, entities, other groups, their communities, and the nation as a whole in a rapidly converging world of diverse communications systems and methods. The invention is designed to be enduring and to transcend advances in telephony technology.

2. Description of the Prior Art

A growing number of natural phenomena and man-made events, conditions, and contingencies, have and will continue to affect personal, family, community, and institutional safety and security. In the post 9/11 world, and in view of recent natural disasters and potential epidemic and/or pandemic threats, there is an increasing need to provide for the safety and security of persons and entities. One such method is to maintain vital communications connectivity. The U.S. Department of Homeland Security (DHS) recognizes the principal role that individuals and groups of people can play in effecting national security. It could well be that a developing situation could prompt one person—not involved in a crisis to merit 911 notification—to communicate with a pre-arranged person. When anyone who is a part of that emergency communications plan calls a telephone number, then one, few, or all of the other members of the plan could be notified, as designed by the organizers of that plan. Thus, there has been a need for comprehensive communications systems to automatically detect and report information of interest—vital communications—between parties. With the rapid convergence of communications technologies that are changing the way telecommunications companies provide voice and data traffic, including the convergence of audio, video, and other data detection and communication systems, identifying opportunities to enhance information sharing between parties, specifically information related to safety and security, has been and will continue to be of paramount concern.

According to the International Engineering Consortium (IEC), telecommunications convergence is the merger of legacy-based time division multiplexing (TDM) architecture with today's packet-switching technology and telephone call-control intelligence, which allows commercial telephony carriers and service providers to consolidate voice and data networks to provide integrated communications services. Prior to the mid-1960s, legacy systems were hardwired into circuit-switching systems. Back then, network operators met with switch vendors, discussed the types of services customers required, negotiated the switching features that provided the services, and finally agreed upon a generic release date for feature availability. The network operator subsequently planned for the deployment of the generic feature/service in the switching network fabric. That process was compounded for the network operator with switching systems from multiple vendors. As a result, services were not offered ubiquitously across an operator's serving area. Also, once services were implemented, they were not easily modified to meet individual subscriber's requirements. As a result, it took years to plan and to implement services.

Innovations in switching and switching environments appeared in the 1970's—i.e., Common Channel Signaling Network (CSSN), or SS7 for short. SS7 is the protocol that runs over the CSSN and the public switched telephone network (PSTN) backbone and provides the standard for determining how conventional telephone calls from a sender are switched through telephone exchanges to a call receiver. The PSTN refers to the assemblage of world-wide public-use circuit-switched telephone networks. Circuit-switching generally refers to a communications networking technology that provides a dedicated data connection between two communicator devices (e.g., telephones) regardless of the number of circuit switching devices the data are routed through. The SS7 protocol network also enabled the introduction of new services, such as caller identification ("caller ID"). The SS7 protocol network was designed before today's intelligent networks were introduced. However, telephone operators realized there were many advantages to implementing and using SS7 network capabilities.

During the mid 1980's, the regional Bell operating companies (RBOCs) began requesting features that could provide for rapid deployment of services in the network, vendor independence and standard interfaces, and, opportunities for non-RBOCs to offer services for increased network usage. Telcordia Technologies responded to the RBOC's request and developed the concept of Intelligent Network (IN/1). The introduction of the IN/1 marked the first time that service logic was external to switching systems and located in databases called service control points (SCPs).

With advances in legacy circuit-switch-based telephony communications system came the identification and development of systems for enhancing vital communications connectivity. U.S. Pat. No. 4,547,877 to Lehman, et al. (1985), for example, describes an apparatus for switching time-multiplexed digital signals and more specifically, for switching time-multiplexed digital signals of different bit rates. It further describes the role of the digital line controller. As disclosed, a switching system is implemented by storing all signals carried by an input group of digital carrier lines in a memory and generating signals to an output group of digital carrier lines from the contents of that memory.

U.S. Pat. No. 4,551,581 (1985) and U.S. Pat. No. 4,582,956 (1986) to Doughty disclose the manner in which a data message can be sent to a selected station during a silent interval between ringing. The patents disclose an apparatus, or a vehicle, for displaying special service information at a selected station during a silent interval between ringing. The stored special service information is then periodically sent to the display unit to begin exhibiting the information during the silent interval before the next ringing signal. Those patents illustrate how certain special services have been made available to telephone customers to provide them with features that render their telephone usage more convenient and more flexible.

U.S. Pat. No. 4,567,323 (1986) to Lottes et al. discloses a method and apparatus for providing a plurality of special services and it addresses such services as automatic recall, automatic callback, and message waiting. Further, it describes solving problems associated with those services. U.S. Pat. No. 4,602,129 (1986) to Matthews et al. discloses an electronic digital signal processor controlled telecommunication system for the deposit, storage and delivery of audio messages that affords users the capability of controlling the delivery of audio messages.

As enhancements to the telephony infrastructure and use of telephony systems were identified, it was also recognized that communications systems create electronic information records specific to a discrete telephone call that could be used for various purposes. Call information could be stored in call detail records (CDRs), which has typically included such things as date, duration of the call, the number dialed, and the status of the telephone call (similar to what is obtainable from a centralized automatic message accounting (CAMA) electronic signal). With the availability of so much information about an individual, his or her phone number, his or her location, and other relevant electronic information, it was recognized that a protocol could be developed for inputting and digesting the information, and causing some action to be taken, such as forwarding and sharing the information with others using various communications modalities.

For example, residential and business owners have relied, for years, on various types of alertment protocols to alert interested pre-selected or designated information recipients of an alarm situation. In particular, a central monitoring service is used to monitor signals received from a homeowner over a telephony network that indicate a fire, burglary, or other event has occurred, and, when a signal is received, initiate a sequence of phone calls to distribute information about the incoming signal. That alertment protocol is less efficient than it could be, because the same person executing the protocol— the monitoring service—typically has to contact emergency response personnel and well as the interested pre-selected or designated information recipients.

Any 911 call initiated by a wired or wireless phone, connected to a public safety answering point (PSAP) via the PSTN, will create electronic information that can then be relayed automatically, according to an alertment protocol, to persons pre-selected by the caller to receive the information. That same information can also be delivered to other communications systems not associated with a PSAP or emergency response resources, to be used to execute an alertment protocol. U.S. Pat. No. 4,219,698 (1980) to Birilli, et al., for example, refers to an alarm system which employs a radio frequency transmitter and a frequency compatible receiver that couples into a telephone system to ring a remote telephone and deliver a message into the receiver of the remote telephone. U.S. Pat. No. 4,491,970 to LaWhite et al. (1985) describes a portable transmitter for an emergency alarm system having a watertight enclosure and which can be worn on the wrist or suspended from a neck chain to provide immediate access in the event of an emergency condition.

Similarly, U.S. Pat. No. 4,237,344 (1980) to Moore describes a response health care communications system for providing rapid and reliable health services to patients located within or outside a health care facility, such as an acute-care hospital. The Moore patent discloses a personnel locator for identifying both the type and the location of health care personnel, such as doctors, nurses, interns, and the like, and a personnel communicating network for communicating with some of those personnel from a central location in order to direct them to patient locations where their need is paramount.

U.S. Pat. No. 4,510,350 (1985) to Wagner discloses a personal alarm apparatus adapted to being worn like a wristwatch for transmitting a radio frequency alarm signal that actuates a signal relay device situated in the user's home. The relay device is connectable to the PSTN via the user's telephone line and, upon actuation, it initiates an alertment protocol by dialing a sequence of telephone numbers stored in memory and then delivering a pre-recorded message when the call is connected. A microprocessor compares the code of the transmitter to a stored code, identifies the user, and retrieves from memory the telephone numbers to be dialed as well as the messages to be transmitted. Because the messages are pre-recorded, the invention does not provide situation-specific information or location information relevant to the user.

U.S. Pat. No. 6,415,018 to Antinucci, et al. (2002), discloses the development, features, and general workings of the United States telecommunications infrastructure and 911 emergency services systems. As disclosed in that patent, the basic emergency reporting system involves special software running on PSAP computers. A PSAP, which state governments typically manage, is a physical location equipped and staffed to receive emergency 911 calls. A function of the PSAP is to dispatch emergency services to the location of an emergency situation. There are currently some 4,500 PSAPs in the United States (and more in Canada) that receive incoming emergency telephone calls over the PSTN. An equivalent to the PSAP, but which is used by governmental agencies (including the military, which often have their own police, fire, rescue, and hazard response personnel), is the emergency operations center (EOC). A military installation may operate an EOC that is responsive to a 911 (or equivalent) telephone call being initiated by a wired or wireless phone of an installation resident. That call is connected to the installation's telephone trunk or exchange via a private switched telephone network (rather than a PSTN).

Automatic number identification (ANI) is another feature of the 911 system that allows the caller's telephone number to be delivered with the call and displayed at the PSAP. An electronic CAMA signal is used to facilitate delivery of ANI-type information to the PSAP. CAMA uses multi-frequency (MF) signaling to deliver 8 digits to the PSAP. The first digit, called the number plan digit (NPD), specifies one of four possible area codes. Digits 2-8 represent the caller's 7-digit telephone number. The ANI is framed with a key pulse (KP) at the beginning and a start (ST) at the end in the format: KP-NPD-NXXXXXX-ST. A caller's name and address, which are stored as electronic records by telephone companies, can also be provided along with ANI-type information. More recently, a PSAP can query an incoming signal to identify the presence of automatic location identification (ALI) information, which is stored in a database and associated with a caller's telephone number provided by the ANI feature. ALI information can be used to ascertain name and location (i.e., address or coordinates) information. The ALI databases are typically maintained by the respective telephone company serving the PSAP.

With the implementation of enhanced 911—called 911 (E)—PSAPs receive the caller's phone number and the exact location of the phone from which the call has been made. 911(E) enables mobile, or cellular, phones to process 911 emergency calls and enable emergency services to automatically locate the geographic position of the caller.

Other descriptions of telecommunications and telephony infrastructure are disclosed in various patents. U.S. Pat. No. 6,243,442 (2001) and U.S. Pat. No. 6,731,721 (2004) to Tanaka et al., for example, describe the role of a telephone exchange apparatus that would, among other things, identify the origin of a 911 call that is originated through an exchange such as private branch exchange (PBX). Important in that disclosure is the fact that the identification information, such as the extension number, is notified not by the dual tone multi-frequency (DTMF) signal expressing data corresponding to the number of the dial key, but by using a MF signal expressing more data, which illustrates an ability to use other existing features of the telephone system for purposes other than those for which it was originally designed. Also disclosed in those patents is a system that utilizes CAMA signals, among other signals, to ensure that an emergency response team can arrive at the origin of the telephone call without fail, but the disclosed invention does not use CAMA signals to detect the fact that a 911 call is or has been initiated.

With regard to emergency telephone systems, U.S. Pat. No. 6,724,860 to Stumer et al. (2004) describe methods and apparata for transmitting accurate emergency location identification numbers (ELINs) from behind a multi-line telephone system (MLTS) after an emergency caller disconnects. The Stumer et al. invention is directed to methods for accurate transmission of ELIN/callback numbers from an emergency caller who initiates a call from behind a PBX/MLTS, including assigning a port equipment number to each device/trunk of the PBX/MLTS and associating ports/devices with ELINs and callback numbers. The invention reportedly detects an emergency number, assigns a call priority, and uses the port/device number to determine the ELIN/callback number. Then, the system properly transmits the ELIN/callback number optionally first over a private network and also to the public PSAP network.

Similarly, U.S. Pat. No. 6,744,857 (2004) to Stumer describes methods for accurate transmission of ELIN/callback numbers from an emergency caller calling from behind a PBX/MLTS that includes assigning a port equipment number to each device/trunk of the PBX/MLTS and associating ports/devices with ELINs and callback numbers. The apparatus of the invention detects an emergency number, assigns the call priority, and uses the port/device number to determine the ELIN/callback number, and then properly transmit the ELIN/callback number over a private network for far-end hop-off to the public PSAP network.

U.S. Pat. No. 6,266,397 (2001) to Stoner, on the other hand, describes an interfacing device to be used with a telephone system terminal for transmitting extended station information to a PSAP. The disclosed computer searches the memory database for information about the specified station which initiated the emergency telephone call, and if the information is located, the computer sends extended station information to the PSAP over a second loop interface while maintaining contact between the specified station which initiated the emergency telephone call and the PSAP.

One of the more perplexing problems facing users of emergency reporting systems—that of being correctly located and to be able to be found for the administering of services—has been addressed in a variety of developments, commencing with wireline, then wireless, and now voice over internet protocol (VoIP) communications systems. U.S. Pat. No. 5,161,180 to Chavous (1992) describes a call interceptor for emergency systems, which is a device for responsively providing, in cooperative association with the 911 emergency system, the number and location of a telephone, especially a PBX extension telephone, from which a 911 emergency call originates. Similarly, problems arise when callers face difficulties during calls to emergency services, such as having to abandon the call for an even more emergent situation or through force or the threat of force. U.S. Pat. No. 4,924,491 to Compton et al. (1990) describes an emergency call service system, such as a 911(E) system, that provides service system personnel with the addresses of abandoned calls to facilitate abandoned call follow-up. When a call comes in to a 911 ANI controller, the calling number is recorded. If the call is abandoned prior to being assigned to an agent position for being answered, an abandoned call ALI function is invoked to obtain information pertaining to the calling number from a database, similarly to a non-abandoned call. When obtained, the information is displayed on equipment such as a printer, terminal, or PC, to make it available to system personnel for use in following up on the call.

U.S. Pat. No. 5,195,126 (1993) to Carrier et al. discloses a simple means to simultaneously notify multiple persons, by telephone, of an emergency by dialing 911. The patent describes a system in which after a user dials 911, either by placing a call with a wired or wireless phone or by activating a button on a transmitter that activates a phone, the system simultaneously places a call to predetermined telephone numbers with a personalized message indicating that there is a potential emergency situation at the user's residence. The 911 call then continues in a conventional manner. The pre-recorded message is repeated several times to ensure the called party is able to record the pertinent information. In the case of a busy/no answer situation, the system continues to call the pre-selected numbers until a connection is made. The system is described as being used as a medical alert system, fire alert system, or a security system. The Carrier et al. patent discloses, inter alia, the use of a CAMA/CDR signal or a process utilizing the CAMA/CDR signal as an alertment device or a trigger to initiate a multi-modal alertment/notification system. It describes a system for monitoring the voice telephone trunks between the central office and the tandem to see if a 911 call has been sent. The Carrier et al. patent specifies the use of in-band signaling—by the use of DTMF analysis—to determine whether a 911 call has been sent.

The Carrier et al. patent describes a 1982 Popular Science advertisement for a table-mounted module associated with a telephone that can, at the press of a button, automatically dial four emergency numbers and give an emergency message. The system is triggered either by a button on the module itself or by a button on a small pager unit adapted to be worn by the user. Upon connecting the call through the system, a pre-recorded message is delivered to alert police, fire departments, and paramedics. The advertisement also states that some of the pre-selected calling numbers may be close relatives or a neighbor for the purpose of rendering immediate assistance while traditional emergency services are dispatched.

A significant problem with the Carrier et al. approach is in deciding which trunks to monitor, as monitoring all trunks would likely be cost prohibitive, and risking the possibility that some calls might be missed. The most significant problem with Carrier et al. is that trunk line class codes may have to be changed to monitor the trunks between the central office and the tandem, resulting in a requirement to modify the 911 infrastructure in order to implement the system described.

In contrast, U.S. Pat. No. 5,805,670 to Pons et al. (1998) describes a private notification system for communicating 911 information to pre-selected or designated information recipients, such as family and friends, identified by a subscriber to the system. The system includes a communications bridge receiving identifying information about a person placing a 911 call, a private command control center receiving the identifying information from the communications bridge, and a notification database accessible by the command control center to provide subscriber data corresponding to the identifying information and contains an embodiment of the system that operates in conjunction with a public safety access point. To activate the service, subscribers complete a questionnaire providing personal information about their location and household and also pay a monthly fee. When a subscriber dials 911 for help and when the telephone call is answered, their data is routed from a database at the PSAP to the 911-call taker/dispatcher. Personnel at the PSAP notify designated emergency contacts that a 911 call has been placed from the subscriber's location. Police, fire and emergency medical services are provided with critical personal information about subscribers, such as medical history and pre-existing conditions, as well as the location of children, elderly or infirm persons within a dwelling. Thus, the service provides emergency services with critical personal information about subscribers and prompts said emergency service personnel to notify designated third parties that a 911 telephone call was initiated. That system, however, relies on human intervention to place a notification call, which is less efficient than a system that provides for the immediate, automatic calling of telephone numbers to notify parties that an emergency telephone call was initiated. In catastrophic situations such as natural or manmade disasters, PSAP personnel could be overwhelmed by the number of calls, and initiating notification calls could be delayed for considerable periods of time or quite possibly abandoned entirely—a situation that was essentially borne out in the beginning of the Katrina disaster and compounded by the destructive failure of the PSTN. Additionally, while such private networks accomplish notification, they are expensive to install, require separate maintenance, and may require special maintenance.

In the same general area, U.S. Pat. No. 6,151,385 to Reich et al. (2000), describes a system for the automatic notification that a telephone call to 911 has been initiated, the system being responsive to a query to a local telephone company's ALI database system. The local telephone provider supplies the new system with the registered subscriber's telephone number (i.e., ANI) and password. The Reich et al. system depends directly upon the ANI and ALI databases from the local telephone provider and describes a database memory maintained by the notifying service.

One of the principal disadvantages to the Reich system, as highlighted elsewhere in the case of Carrier, is the requirement to alter the 911 infrastructure to effect a change in the ALI database server so that it sends a message containing the telephone number associated with the telephone making the 911 call to the computer system.

U.S. Pat. No. 6,587,545 to Antinucci et al. (2003) describes a system for providing expanded emergency service communications in a telecommunication network including an array of switches, junctions, channels, customer-operated communication devices and service providing stations. In that patent, the network is connected to facilitate communications among a service-provider station, an emergency complex, an emergency answering position, and an expanded service subscriber. The invention is described as providing additional information regarding the number served, such as language requirements, handicapped person status, oxygen tanks on premises, blood type or other special medical information, or other details of interest to emergency service personnel responding to calls. Such supplemental information would be provided to a PSAP coincident with the routing of an emergency service 911 telephone (voice) call to the PSAP for action and response. The patent also describes the desirability of additional notification for special number call systems, such as emergency service systems receiving telephone calls placed from a particular residence. Further, notification may be sent to a destination medical facility for emergency service personnel responding to a service request. The notification may include some of the supplemental information described above. In such manner, a medical facility may be forewarned of special circumstances involving a patient who is expected to arrive soon.

In a related area, U.S. Pat. No. 6,028,915 to McNevin (2000) describes a method and apparatus for making an emergency telephone call while on-line on a computer, in this case, in a dial-up mode of operation on a conventional telephone line. The method and system for making the call includes an input device attached to the computer that is adapted to receive a command from a computer user for making an emergency telephone call. When the user initiates a command to initiate an emergency telephone call from the input device, a software program executing on the computer overrides all computer functions and transmits the emergency call to an emergency call receiver through the network or by a telephone line. The software program takes priority over all other computer applications on the computer. The invention transmits the emergency call using a computer generated signal, or by computer generated voice, or by way of a facsimile transmission. While the computer was generating the emergency call, it could have also initiated a process to provide notification directly to the caller's support group. In some cases, the individuals who make up that support group might be able to provide aid and assistance more quickly than primary emergency services.

All of the aforementioned patents that describe automatic notification using emergency communications systems depend upon the normal functioning of the emergency services and the dispatch operation telecommunication systems and the various features that support the PSAPs and identification of signals, such as those containing ALI and ANI-type information. None of the systems, however, refer to an ability to identify the use of other discrete numbers of interest or have as a primary focus various ties to personal, family, or community communication systems to provide for security.

Moreover, the aforementioned patents do not specifically address the issue of VoIP or addresses the issue of cancellation of the automatic notification, an alternate number for notification, a test circuit that could be used to test notify potential pre-selected or designated information recipients without actually initiating a 911 telephone call, non-switch/non-system related notification, multimodal notification through either stand-alone systems, an entirely hosted system, or a combination of independent and hosted systems, family emergency communication planning, or personal notification services.

Today, the PSTN is still one of the most reliable communications networks in existence. Using traditional PSTN services as an access point to the Internet has significantly encouraged the growth of data over costly Class-5 facilities, resulting in the need to reengineer the traditional TDM architecture. Convergence technologies will provide a packet-based architecture that combines the speed and efficiency of broadband with the full-featured SS7 architecture to create a hybrid network in which carriers and service providers can choose route options based on cost, efficiency, and fault management. Convergence of technologies, however, is not accomplished by acquiring a single box, according to the IEC. Rather, those who intend to compete in the converged market space face significant challenges in choosing the correct equipment and software, configured to provide them with the capabilities required to compete in today's Internet economy. Investors, entrepreneurs, and existing vendors must appreciate the complexities of the convergence or risk the delays and unnecessary expense of adopting the wrong strategy. At the current pace that technology changes, a company cannot afford to commit exclusively to any particular proprietary or standard protocols.

Until the present invention, the prior art emergency notification systems focused upon conventional wireline telephony communications systems, focusing most recently upon the utilization of the capabilities embodied in the concept of Advanced Intelligent Network (AIN), developed and standardized by Telcordia Technologies. The convergence of communication technologies—including wireline, wireless, VoIP, and hybrids—requires a broader capability for the use of the telephony systems for vital communications connectivity.

In another related area, U.S. Pat. No. 6,600,811 to Patel et al. (2003) describes an invention relating to, among other things, telephone switching systems and the detection of failures in emergency calls. As reflected throughout the literature, the public telephone network is equipped to handle certain emergency calls, which are typically initiated by dialing a special number dedicated for emergencies, such as 9-1-1. Those telephone calls are typically routed to a regional center of operators that handle the calls and initiate the dispatch of services needed to respond to the emergency. Those services include, for example, police, fire and paramedics. Emergency calls typically receive special treatment in the telephone network. That treatment generally includes dedicated resources for handling the calls and specialized routing. Unfortunately, the general monitoring of the integrity of a switching system does not adequately identify problems in emergency calls. Indeed, it is possible that a problem with all emergency calls through a switching system may go undetected where the majority of non-emergency telephone calls are successful. This problem is exasperated by the fact that emergency telephone calls are often routed using dedicated resources. Thus, a problem with a dedicated resource may cause all emergency calls to fail, while non-emergency calls, which do not rely on the faulty dedicated resource are completed without error.

As an example, it is possible that through some fault, all emergency trunks on a switching system are out of service, while other resources are available. Nonetheless, system integrity monitoring may not alert an operator because the total failure of all emergency calls may not result in an error threshold sufficient to assert an alarm.

U.S. Pat. No. 5,864,755 to King et al. (1999) describes a method for allowing a mobile phone to receive a call through a wireless network for which it is not registered, for emergency purposes, through the use of a set of direct inward dialing numbers (DIDs) that are used exclusively for emergency calls and, in one embodiment, the DID assigned to the wireless telephone also identifies the antenna closest to the wireless telephone. The use of such direct inward dialing numbers could initiate a notification sequence, independent of the actual notification of the emergency reporting system.

U.S. Pat. No. 6,584,307 to Antinucci et al. (2003) describes a system and method for communicating between a special number call answering agency and a mobile action asset. In a system and method for communicating between a special number call answering agency and a mobile action asset, the answering agency answers a special number call placed by a caller. The mobile asset participates in responding to the call. The answering agency and the mobile asset communicate wirelessly. The answering agency recognizes and interprets special number information, including at least one of caller identification and location information. The system comprises: (a) a special number receiving terminal located with the mobile asset and configured to receive and display selected information of the special number information; the receiving terminal being configured to dial back the caller based upon the selected information and (b) a call bridge configured for actuation at the call answering agency to connect the caller with the mobile asset and provide the selected information to the mobile asset when the call bridge is in an actuated orientation.

U.S. Pat. No. 6,678,357 to Stumer et al. (2004) describe an Internet Protocol (IP) Telephony Emergency Connections (ITEC) system and method that determines the precise origin of an emergency call and routes the call to the proper PSAP. A source-based routing mechanism is provided in an IP telephony type network, such as a VoIP or IP over LAN/ATM network. In the invention, emergency telephone calls are routed to the correct PSAP jurisdiction. Each server/switch may include the mechanism such that the IP telephony network can identify a 911(E) connection and egress to a public network at a point closest to the emergency telephone call point of origin. Whenever an emergency number telephone call is made, the call's origin is determined during call setup establishment. Every port or end user jack in the network is assigned a Source Group Index (SGI), which is a number or index representing each PSAP jurisdiction in the network. All ports/jacks within the same PSAP jurisdiction are assigned the same SGI. Users may be in different areas of multiple PSAP jurisdictions. While the system and method reference the manner in which the 911 calls are identified and given geographic reference, it is the normal functioning of the VoIP system that is of interest. In the case of a notification system, the CDR file can be used to initiate the notification system, along with direct notification from the system rather than viewing the VoIP as simply another manner of performing the functions of conventional, wireline telephony system.

In a development related to communication connectivity, U.S. Pat. No. 6,690,932 to Barnier et al. (2004) describes a system and method for providing language translation services in a telecommunication network, an obvious important feature in today's global community.

With the introduction of the SCP concept, new operations and management systems became necessary to support service creation, testing, and provisioning—i.e., service-specific management systems. That meant that software-defined hooks or triggers would be specific to associated services. That also meant that although the service logic is external to the switching system, it was still specific. The introduction of AIN differed in that the AIN is a service independent network capability.

U.S. Pat. No. 6,882,718 to Smith (2005) highlights the use of the AIN system to provide multiple services per trigger type, noting that AIN has allowed carriers to provide customers with a variety of enhanced call processing features and telecommunications services beyond those enabled by conventional switching circuits of the PSTN. U.S. Pat. No. 6,442,241 to Tsumpes (2002) cites dissemination of information through a plurality of communication routes, but the notification is generally applicable to security or alarm systems. U.S. Pat. No. 6,201,856 to Orwick (2001) describes an emergency telephone call notification service system and method that utilizes AIN, an intelligent peripheral in communication with the AIN capable switch, a service control point, and a public service answering point (PSAP) in communication with the SCP and the switch to provide a pre-designated message stored in memory. U.S. Pat. No. 6,295,346 to Markowitz et al. (2001) describes an automated emergency notification system that places prioritized telephone calls to pre-selected or designated information recipients and plays a pre-recorded message. The system contains call interrupt sequences and an 800 number for emergency notification.

U.S. Pat. No. 6,427,001 (2002), U.S. Pat. No. 6,608,886 (2003), and U.S. Pat. No. 6,792,081 (2004) to Contractor (i.e., Sunil, et al.), describe a system and method for notification of 911 telephone calls using a link monitoring system, a method and apparatus for establishing a connection between first and second communication devices and an emergency notification system based upon a first and second server (communication device). U.S. Pat. No. 6,427,001 discloses the problems encountered by other notification systems cited in its references, including some of those cited herein. The invention solves problems encountered in other automated notification systems by establishing a link monitoring system (LMS) for monitoring an SS7 link for messages indicating the presence of a 911 call. The patent discloses one such LMS and its manufacturer. U.S. Pat. No. 6,608,886 discloses additional functionality compared to the previous patent, including the sensing and placing of telephone calls between the subscriber placing the original call and one of the pre-selected or designated information recipients. Finally, U.S. Pat. No. 6,792,081 describes an emergency notification system that utilizes AIN functionality and, inter alia, identifies a specific AIN-related trigger to initiate the notification process, which is conducted sequentially and cancelled upon successful notification.

In all of the foregoing systems and methods, there are several shortfalls and problems with implementation that argue for a comprehensive system. Among them is the need for automated and simultaneous notification of one, few, or many pre-selected or designated information recipients, without regard to sequence or presumed importance, through a multi-modal communication means. Most of the previous inventions focus solely upon the placement of calls to the 911 system and disregard the many other methods in which persons could receive information, highlighting the obvious lack of a single, comprehensive system that can provides for establishing and maintaining vital communication connectivity. More importantly, the previous inventions do not address a multi-modal manner of information distribution and do not address VoIP systems or combinations of existing and emerging systems, such as the combination of wireless, wireline, VoIP, and hybrid systems. In particular, the Sunil patents do not detail the functions and functionality of the AIN system, previously noted to have been developed and standardized by Telcordia Technologies. There are several shortfalls of these and the other systems cited in the context of notification in an era of converging telephonic technologies, notably that convergence requires a broader capability for the detection of not only calls placed to the 911 emergency reporting and response system, rather communication regarding a broad range of significant, and critical notification by individuals, family/communities, enterprises, and governments, in essence-vital communication connectivity.

As with all of the foregoing, wireless networks are evolving rapidly and have the advantage of beginnings that are relatively recent in the history of telephony. Wireless Intelligent Network standards have been approved and, in a similar fashion to wireless, the standards will permit enhancement of services, such as those enjoyed by wireline and the seamless continuity of those services during roaming. Owing to the requirements of convergence, previously discussed, wireless subscribers will demand the same type of features and services as those received from wireline carriers and will want those features and services to operate in a similar fashion. The proliferation of automated notification systems has not been experienced within those systems because of difficulty with geo-location information. The present invention discounts that presumed impediment and includes those systems into a comprehensive architecture. The same situation applies to voice-over-internet protocol (VoIP) telephony and to other IP-enabled data transfer means and communicators that could be used to design, create, and maintain vital communication connectivity, especially connectivity related to the health, welfare, safety and security of individuals, families, enterprises, and governments.

The greatest impact upon conventional telephony—and one of the two items that are transforming the industry—is the advent of VoIP. Frost and Sullivan and other industry analysts project VoIP will account for 75 percent of world voice services by 2007. Others analysts, such as those at IDC, have predicted that IP will account for 72 percent of new telephony connectivity by 2008. Regardless of the exact numbers, a variety of analysts and publications have noted that it is clear that we are witnessing the curtain closing on traditional, stand-alone telephone systems.

U.S. Pat. No. 6,731,625 to Eastep et al. (2004) describes the integration of the Internet with telephony systems, and more specifically, to a system, method and article of manufacture for using the Internet as the communication backbone of a communication system architecture while maintaining a rich array of call processing features, which were not, at the time of the present invention, available on the Internet. Thus, the Eastep et al. patent describes a system to connect a communication network including telephony capability with the Internet to facilitate callback processing. In one embodiment of disclosed invention, telephone calls, data and other multimedia information are described as being routed through a switched network which includes transfer of information across the internet to provide multi-routed and multidimensional callback processing. The patent discloses recognizes the ability of IP telephone systems to generate data of relevance that could be used directly to initiate notification of the use of any discrete telephone numbers of interest.

What the above patents teach is how existing telephony and telecommunications systems can be altered to achieve a new use of electronic signals and stored information about telephone calls and telephone callers, and they illustrate how electronic signals can be used to create additional services not previously contemplated when the telecommunications systems were developed.

SUMMARY AND OBJECTS OF THE INVENTION

In view of the foregoing, it should be apparent that there exists a need for a comprehensive, multi-modal, communications system that receives, processes, and disseminates information regarding the use of any individual communicator device (by any given wireline, wireless, VoIP telephone, combinations of those technologies, or other emerging communications technologies that would accommodate audio, video, and other data communications) to communicate with a variety of discrete communicator addresses (e.g., telephone numbers, fixed IP address, etc.). The need extends to communications systems for which there is a requirement to identify any and/or all communicator addresses by specific communicator devices and to provide the automatic, timely notification of such usage to individuals, groups of individuals, entities, groups of entities, associations, and things (e.g., computers) and to provide a service to which all entities can subscribe.

The current invention is presented as being inherently private to the subscriber and the functioning of the subscriber's communicator devices. Personal security planning is part of the operation of the system. Within this invention, no attempt is made to derive information from a public or publicly-funded emergency operation or apparatus, rather to report to subscribers, in timely fashion, the manner in which the subscriber's communicator device is being utilized and to notify others of that specific information—at the discretion of the subscriber. Similarly, there is a need for individuals, families, and organizations to be able to communicate with others to provide critical essential, and significant information, in essence, vital communications connectivity.

All automatic notification of numbers dialed, particularly in the case of emergency services notification and dispatch operations, are preferably accomplished by means other than those directly related to the keying or operation of those systems.

Unlike systems designed to provide the location of the calling telephone, the present invention is designed to inform pre-selected designees—who might not otherwise know of the existence of an emergency of any type—that an emergency telephone call has been originated from a number of interest, or that specific new information is available to them. Further, unlike many other systems, this invention does not depend, in any manner, upon the functioning of the emergency reporting system itself, or any other system in the case of other numbers, rather the existence and normal operation of the wireline, wireless, VoIP, and other data, video, and voice communications means. Most important, this invention provides for the multi-modal notification of such action, which will operate independently of the public emergency notification and response system.

The present invention may be operated in parallel with, for example, a PSAP, an EOC, or a family emergency planning and communications (FEPAC) service, which is a third party service entity that can provide all the services contemplated by the present invention that would be needed by a family unit to subscribe to a service that implements the present invention.

In the case of the emergency reporting and response system, the current invention, aided by a software and/or hardware, will detect the origin of the placement of a call to the system, or the placement of a call to any other discrete number of interest, and will simultaneously, immediately, and automatically signal a receptor that will send alertments to a partial or comprehensive list of pre-selected or designated information recipients. Those alertments will be directed to wireline, wireless, and VoIP phones, personal data assistants (PDA's), pagers, and all other manner of communicator devices that receive and transmit information, including formats such as the short messaging system (SMS), instant messaging (IM), e-mail, fax, and website. They will include text-to-speech and speech-to-text conversion, the embedding of voice and video files to convey information, and to perform multiple language translation where necessary or desirable. Such notification will occur independent of the success or failure of the telecommunications network designed to provide connectivity to the emergency reporting system or to actually respond to an emergency.

Use of the 911 emergency reporting system (and its equivalent in other countries) provides a good example of the use of the present invention. According to the National Emergency Number Association, approximately 200 million calls are placed each year in the United States to emergency services notification and dispatch operations—commonly known in the United States and Canada as 9-1-1 systems—with a growing number of them placed by wireless phones and VoIP systems. Throughout the world, similar emergency reporting systems and emergency response resources are in place or are emerging. While 200 million calls is a seemingly large number in a population of approximately 300 million people in the United States, it is not a large number in the context of the number of telephonic transactions conducted by a combination of approximately 400 million telephones over the period of one year.

Assuming appropriate usage of the emergency reporting system, at the time a telephone call is initiated to contact an emergency response resource, the caller has elected to notify emergency services regarding a situation requiring immediate assistance, rather than to notify other individuals, entities, groups, or organizations that may form a part of the caller's family, social, or organizational support network. In some situations, notifying network members, instead of the emergency response resource, might result in a loss of response time on the part of emergency response services, which could be critically important if the caller's emergency requirement involves time-sensitive, life-or-death considerations.

Further, there may be instances when an individual would like to know when another individual's communicator device has initiated a telephone call to certain discrete communications addresses (e.g., specific telephone numbers) as an indication of some other matter of interest to the individual. That is not to say that the determination of the utilization of discrete communications addresses must or should be the subject of surreptitious collection. Detection and collection would be undertaken with the knowledge and endorsement of the owner of the communications device, thereby ensuring privacy for the individual.

As summarized above, the present invention involves the use of communications systems, including wireline (including portable wireline—i.e., cordless phones), wireless (including those with a "walkie-talkie" feature), VoIP, other web-enabled communications systems, and other emerging telecommunications technologies, including combinations of those systems, that would accommodate communications of the same nature, all broadly addressed herein as communication or communicator devices. The present invention involves communications systems for which there is a requirement to identify numbers dialed by specific communicator devices and to provide the timely notification of such usage.

The present invention involves the creation and utilization of an alertment protocol—derived through one, few, or many aspects of the normal operations of the communications systems, in essence, by the "physics of the process" to initiate multi-modal dissemination of the notification information through wireline, wireless, VoIP, other web-enabled systems to include, but not be limited to, short messaging system (SMS), e-mail, Internet site, pagers, PDA's, mobile and fixed computing devices and all other communicator devices capable of receiving audio, video, and other data. In some cases, such as the automatic detection of numbers dialed, the system will utilize the capabilities of the AIN and WIN systems.

The function of the present invention bears no relationship to the functioning or operation of any other system, including emergency response resources. It relates to the functioning of the subscriber's communicator device(s). The present invention is also consistent with DHS efforts to promote family emergency planning, one of the principal objectives being to promote family emergency communications planning, which can logically be extended beyond the family to the social support network and community, in its broadest sense, to include enterprise and government levels and extended to international communications.

In some instances, such as the use of the emergency notification system, initiating a communications connection by, for example, dialing a specific emergency number may be for the benefit of another—a Good Samaritan call—and not for the individual placing the telephone call. In those instances, a method exists for preventing the automatic notification at the discretion of the subscriber placing the call.

Additionally, there may be instances in which an individual is involved in an emergency that would normally require placement of a call to emergency services notification and dispatch operations and that call has been placed on behalf of the subscriber—a Good Samaritan call—and the members of whose support network have not been notified. In such cases, an alternative path to the notification system is provided to ensure that others are notified, regardless of the efficiency or effectiveness of the emergency reporting system.

There are still other instances in which a perilous situation has evolved for which a person other than the subscriber places a call to an alternate number and achieves the requisite notification of the subscribers support group with or without the initiation of an emergency call.

A preferred embodiment of the system aspect of the invention will include internet protocol enabling (IP enabling) of the initial signal received from the trigger of a call placed to an emergency reporting and response system, or other discrete number of interest, which might be accomplished through the generation of any number of IP enabled signals, such as an extensible markup language (XML) message file. Those IP-enabled signals could be used to further trigger notification system software that will disseminate desired message files in the form required by each notification medium and/or communicator device—or to take other appropriate action.

In the event that telephone calls are placed to emergency reporting and response systems, but do not affect the health and welfare of the individual reporting the incident, such as an individual witnessing an accident or calling to report a fire not involving that caller, a cancellation code (non-notification code) will be initiated at the same time that the 911 call is originated, such as (NNN) 911 that will preclude the auto-notification of the subscriber's support group.

In the event that a perilous situation occurs in which a subscriber is subjected to a situation in which he or she would desire to initiate the notification system, but for which another has already placed a call to an emergency reporting and response system (the Good Samaritan call), an alternate telephone contact number will be used by the caller to initiate the same notification scheme as if the subscriber had placed a call to an emergency reporting and response system, without initiating a second call to the those services. That notification would utilize a Star Code number—selected and established in cooperation with the subscriber's carrier—that would permit forwarding to a local or 800 number and interface directly with the notification system.

The foregoing approach also permits the initiation of a system-independent placement of a call to an emergency reporting and response system by dialing the Star-Code.

In addition to the foregoing, it is preferred that a test number (star code, local, or 800) and circuit be used to test the notification system without interfering with the normal functioning of the emergency reporting system.

During the notification process, in addition to the system log maintained to track the notifications, a series of notification reports can be assembled for reference.

The present invention would provide automatic, simultaneous, and immediate alertment to the pre-selected or designated information recipients. Those recipients will not know why a call to an emergency reporting and response system was placed by a subscriber of interest to them, but the notification system would have provided information to them.

Origination of calls on a conventional wireline telephone, using the keypad, provides several options for detecting the initiation of a signal in addition to those originally intended/designed for its operations. There are, of course, operator assisted calls that would have be detected through other means and an alternate notification approach is provided as part of this invention.

In addition to applications related to personal safety and security, similar applications exist in the public sector, related to public health and safety, which is consistent with family emergency planning encouraged by the DHS that can be served through this invention.

The present invention may be implemented as a subscription or fee-based service that an individual, group of individuals, entity, or group or association of entities could use in one or more of the following ways:

The system and method could be used by an individual who subscribes to the service for his or her home phone or wireless phone that connects through a telephony system to the PSTN, so that when the individual initiates a telephone call to an emergency response resource, other persons or things pre-selected or designated by the individual will receive certain relevant information about the individual and the telephone call.

A family or community unit—including organizations—could utilize the system for emergency planning and communications during emergencies through the initiation of a single communication to a pre-designated number.

Enterprises could use the system to support all phone lines in an office (or multiple offices) that route through, for example, a PBX that connects to the PSTN. That scenario might be important to an employer, for example, having a headquarters office in one city and its employees or customers scattered in other locations (e.g., a national media company, a rental car company, and a trucking company, etc.) and wishes to be notified immediately when a remote employee or customer initiates a telephone call to an emergency response resource. Similarly, the enterprise could use the system to provide vital communications connectivity to and from its employees and associates to communicate critical, essential, and significant information.

Governments could use the system for selected phone lines (wireline, wireless, or VoIP) that route through a proprietary communications network. That scenario might be important to a homeland security authority, for example, who wishes to be notified when an employee of the Secret Service has initiated a telephone call (or sent an audio signal over a bi-directional radio-frequency band) to an emergency response provider.

Utilization of the system could be beneficial at the government level. A good example is a lesson from the Katrina catastrophe: many days after the placement of emergency calls to emergency reporting and response systems by individuals, U.S. Marshals commenced the painstaking—and in some instances grizley—task of tracing down the individuals who placed those calls. Some calls were placed by the elderly, infirm, and disabled, who were not able to escape from their homes in the face of the deadly onslaught of flood waters, and subsequently perished. If the alternative methods of notification were available to them, they might have been helped by the members of their support groups.

The system and method of the present invention could be used by a central contact person (CCP) within a FEPAC unit to monitor when a member of the FEPAC initiates a telephone call to contact an emergency response resource—or as a matter of coordination—extended to the individual, unit, enterprise, and government.

Accordingly, a primary objective of the present invention is to provide vital information connectivity to individuals, family and community units, enterprises, and governments, such information consisting of action-oriented, critical, essential, and significant information.

It is another objective of the invention is to provide such information services through the convergence of multi-modal means of communications and stand-alone equipment placed within carriers' networks and/or a single (or multiple) hosting site(s) that will receive, process, and act upon various triggers received automatically from systems and those received from individual communicator devices, regardless of source, and disseminate them in a plurality of multi-modal communication paths to the user community.

It is still another object of this invention to provide for the automatic and multi-modal identification of members of any group when any member of that group calls a designated number of interest.

In view of the possibility of operator-assisted calls, it is also an object of this invention to provide for the alternate and backup route of operator-assisted calls to interface with the automatic notification system.

It is still another object of the present invention to provide an information distribution and alertment system designed to take advantage of signals generated when a person or thing initiates a telephone call (or other triggering communications method) to contact an emergency response resource—including numbers other than those associated with Public Safety Answering Points (PSAPs).

It is another object of the present invention to provide a system for converting an incoming signal into an appropriate signal format, such as a markup language text file, and transmit an alertment based on the same to a variety of pre-selected or designated information recipients in a multi-modal manner.

It is still another object of the present invention to provide a system for distributing information and alerting pre-selected or designated information recipients over a communications network, including wireline, wireless, and Internet networks.

It is another object of the present invention to provide a system using VoIP, PDAs, pagers, and telephony devices to distribute information in the form of short-message service (SMS) text messages, instant messaging (IM) messages, electronic mail, web pages, downloadable files, and the like.

It is still another object of the present invention to create vital information connectivity across the communication spectrum from wireline to wireless to VoIP to data, image, video, voice, RF and other means.

It is another object of the present invention to provide a system that will detect the placement of calls to an emergency reporting and response system and will provide alertments and notification in the use of that system.

It is still another object of the present invention to provide notification in the form of a simple notification to pre-selected or designated information recipients that a call to an emergency reporting and response system (or equivalent in countries outside the US) telephone call has been initiated by a person or thing.

It is another object of the present invention to provide a system and method that does not interfere with, or impact, the placement of a call to an emergency reporting and response system (or equivalent in countries outside the US), nor impact any part of the emergency reporting and response systems.

It is still another object of the present invention to provide a system and method that will detect the initiation of an emergency telephone call, in a manner similar to that through which means telephone billing information is collected, and/or the features of Advanced Intelligent Network (AIN)/Wireless Intelligent Network (WIN), and a variety of other methods available through VoIP, without impact upon calls placed, and that will trigger a plurality of alertment processes.

It is another object of the present invention to provide a system that will provide for text to voice translation within the sensing and notification system It is still another object of the present invention to provide a system that will provide for translation of voice-to-text and translation of text-to-voice within the sensing and notification system.

It is another object of the present invention to provide a system that will permit for parallel language translation within the sensing and notification system.

It is still another object of the present invention to permit subscribers to initiate calls directly to the central processing point that would initiate or preclude notification to pre-selected or designated information recipients.

It is another object of the present invention to permit subscribers, and/or related support group, to provide monitoring across a broad range of temporary and permanent conditions, including disease states, diagnostic areas, those facing mental and physical challenges; post-operative states; and, latch-key children; to report upon the health, welfare, safety, and security of individuals and groups being monitored; to provide dissemination of that information; and, to provide direction to those monitored individuals or groups.

It is still another object of the present invention to provide a system and method that "pushes" information down to all communicator devices or provides information that can be "pulled" by all communicator devices upon accessing a communications network.

It is another object of the present invention to provide a system that will provide multi-modal notification.

It is still another object of the present invention to provide a system that will permit determination of a call placed to 911 or other discrete numbers of interest.

It is another object of the present invention to provide a system that will simultaneously address the detection, processing, and dissemination of notification-related signals and information for wireless, wireline, VoIP, and hybrid communication systems.

It is still another object of the present invention to provide a system that will provide for non-notification (precluding automatic notification) utilizing a Star code (e.g. *NNN) prior to initiating an emergency or other "designated" call.

It is another object of the present invention to provide a system that will accommodate notification of the placement of a 911 call or call to other numbers of interest through one, few, or many stand-alone or hosted systems.

It is still another object of the present invention to provide a system that will provide the means for geo-location of the individual place the call of interest—the initiating call.

It is another object of the present invention to provide a system that will permit diagnostics across the entire structure of subscriber, processor, and dissemination systems.

It is still another object of the present invention to provide a system that will permit alternate number notification by both subscribers, pre-selected or designated information recipients, and others.

It is another object of the present invention to provide a system that will assist in the placement of a 911 call by using another number in conjunction with a subscriber's direct communication with the notification system.

It is still another object of the present invention to provide a system that will permit subscriber testing of that part of the notification system, designed to provide automatic notification of the use of the emergency reporting and response system, without the test initiating an emergency call.

It is another object of the present invention to provide a system that will permit "system-independent" notification of the use of the 911 emergency reporting and response system.

It is still another object of the present invention to provide a system that will provide system independent notification of subscribers social support group, or population, It is another object of the present invention to provide a system that will permit notification of a variety of pre-planned and pre-selected scenarios to permit emergency communications planning.

It is still another object of the present invention to provide a system that will permit the use of an interactive voice response system and keyed digits.

It is another object of the present invention to provide a system that will permit insertion of geographic location information into the information provided to pre-selected or designated information recipients of notification alertments.

It is still another object of the present invention to provide a system that will permit incorporation of a voice recording of the subscribers name into the notification or notification message.

It is another object of the present invention to provide a system that will permit text-to-speech and speech-to-text translations of inbound and outbound aspects of the alertment and notification system.

It is still another object of the present invention to provide a system that will permit multiple language selection and translation for delivery of notifications.

It is another object of the present invention to provide a system that will permit communications with the hearing impaired through alternative methods.

It is still another object of the present invention to provide a system that will permit a variable number of attempts to deliver notifications.

It is another object of the present invention to permit the discrimination of phone mail, answering machines, and live human respondents.

It is still another object of the present invention to provide a system that will permit the storage and retrieval of subscriber profiles.

It is another object of the present invention to provide a system that will permit the storage and retrieval of subscriber preferences regarding notifications.

It is still another object of the present invention to provide a system that will permit notification by individuals, family/community groups, enterprises, and government entities of notifications that contain pre-recorded messages, non-recorded messages, and messages recorded on-the-fly.

It is another object of the present invention to provide a system that will permit the preparation, storage, and retrieval of records and reports of all types, including failures to deliver notifications.

It is still another object of the present invention to provide a system that will accommodate notification of the placement of a 911 call, or call to other numbers of interest, through one, few, or many stand alone systems.

It is another object of the present invention to provide a system that will accommodate notification of the placement of a 911 call, or call to other numbers of interest, through one, few, or many hosted systems.

It is still another object of the present invention to provide a system that will permit subscribers to place calls to an emergency reporting and response system for others (i.e., Good Samaritan—*NNN) that will not result in notification of the subscriber's support group.

It is another object of the present invention to provide a system that will permit critical support group notification through the use of any alternated number, but may be most beneficially accomplished through the use of a Star Code, e.g., *333.

It is still another object of the present invention to provide a system that will permit the use of a Star Code (* code), which will verify subscribership, provide a confidence tone, and permit the subscriber to select a variety of notification options for pre-selected or designated information recipients.

It is another object of the present invention to provide a system that will permit the use of a local number with selectivity for other options.

It is still another object of the present invention to provide a system that will permit the use of an 800 (or similar) number with selectivity for other options.

It is another object of the present invention to provide a system that will permit the use of a Star Code, local, or 800 (or similar number) to obtain a status report on a subscriber number.

It is still another object of the present invention to provide a system that will permit alternate number notification (through the use of a Star Code, local, or 800 number).

It is another object of the present invention to provide a system that will permit alternate number notification (through the use of a Star Code, local, or 800 number) for a subscriber by another subscriber or non-subscriber.

It is still another object of the present invention to provide a system that will permit notification of a variety of pre-planned scenarios and pre-selected notification groups to permit notification without further action.

It is another object of the present invention to provide a system that will permit the usage of a variety of AIN, WIN, and other system-related triggers (such as specific-digit-string-trigger, or N11 trigger, to detect the placement of calls to emergency reporting and response systems (such as 911 in the United States and Canada) and other discrete numbers of interest.

It is still another object of the present invention to provide a system that will permit the usage of a variety of AIN, WIN, and other system-related triggers to detect the utilization of existing features—such as warm-line and hot-line—to achieve automatic notification to pre-selected or designated information recipients.

It is another object of the present invention to provide an alertment system for providing alertments and other information to members of subscriber's support network (broadly defined, but not limited to) family, neighbors, organizations, and community groups upon which the subscriber is dependent or that depend upon the subscriber, regarding placement of a telephone call to one or more of a set of discrete telephone numbers.

It is still another object of the present invention to provide vital information connectivity—comprised of critical, essential, and significant information—to individuals, family and community units, enterprises, governments, and universally from the same alertment and notification system.

It is another object of the present invention to permit the subscriber to utilize the notification system for a variety of applications that may bear no relationship to emergencies.

It is still another object of the present invention to provide security for the alertment and notification system consistent with enhanced security techniques.

It is another object of the present invention to provide for data collection within the same alertment and notification system to meet current and projected needs of the system.

It is another object of the present invention to collect information about 911 or emergency calls initiated by subscribers in order to collect fees for use of the invention.

It is still another object of the present invention to generate fees from a subscription service to provide vital information connectivity.

It is another object of the present invention to permit retrieval of a status report with regard to any account to determine if there has been an attempt to provide notification to any part with regard to any event, whether the placement of a 911 call, a Good Samaritan call, a Critical Support Group Notification call, notification from an alternate number on behalf of the subscriber, or any other notification utilizing the same alertment and notification system.

It is still another object of the present invention to create a record for historical purposes with regard to delivery, attempted delivery, and failed delivery of various alertments and notifications. It is another object of the present invention to provide a system that will permit the use of an interactive voice mail system, website/graphical user interface, e-mail, and regular mail to accomplish administrative tasks related to the creation, change, and maintenance of user-related information.

It is still another object of the present invention to provide an input that allows a subscriber to enter into a database those pre-selected or designated information recipients to be notified automatically in accordance with subscriber instructions.

It is another object of the present invention to provide an input that allows a person to enter into a database—through a plurality of methods—one, few, or many communication addresses of individuals or things that causes the person to receive an alertment when the individuals or things initiate a telephone call or other type of communication method to an emergency response resource.

It is still another object of the present invention to provide a system that will provide a database of subscriber versus pre-selected or designated information recipient information to permit file transfers, up-loads, and downloads, etc.

It is another object of the present invention to permit multi-modal creation, modification, maintenance, and cancellation of all applications to the alertment and notification system through mail, fax, e-mail, internet site, the telephone, or other voice, video, and data systems.

It is still another object of the present invention to provide a system that will permit the use of a variety of security devices, such as PINs and security codes.

It is another object of the present invention to provide a system that will accommodate multiple or repeated deliveries of notifications.

It is still another object of the present invention to provide a system that will accommodate repeated notification message selection.

It is another object of the present invention to provide a system that will accommodate confirmation of receipt of delivery of notifications, through various feedback mechanisms, both automatic and manual.

It is still another object of the present invention to provide a system that will permit the use of security controls, PINs, passwords, and access controls.

It is another object of the present invention to provide a system that will permit storage to incorporate cells of information to preclude compromise of an entire data base.

Briefly described, those and other objects and features of the present invention are accomplished, as embodied and fully described herein, by a communications system used for collecting, processing, and transmitting information signals over communications networks originating within the same or different communications networks, the communications system having a device for developing, identifying, and/or utilizing electronic trigger signals related to calls initiated within a first communications network, a database for storing information related to the triggers and one or more users and information recipients, and a notification device that transmits multi-modal signals over the first communications network or over a second communications network to the recipients, wherein the signals contain information related to the triggers.

Briefly described, the objects and features of the present invention are also accomplished by a method of distributing alertment information to the recipients over one or more communications networks, which includes the steps of detecting when a triggering event has been initiated by a user to connect with an emergency response resource; receiving information about the user or a communicator device associated with the user that caused the triggering event; formatting a report containing information received about the triggering event, the user, and/or the communicator device; and transmitting the report as a multi-modal signal to at least one pre-selected information recipient designated by the user.

With those and other objects, advantages and features of the invention that may become hereinafter apparent, the nature of the invention may be more clearly understood by reference to the following detailed description of the invention, the appended claims and to the several drawings attached herein.

BRIEF DESCRIPTION OF THE DRAWINGS

FIG. 3 is a drawing of a lookup table showing a subset of the universal emergency telephone numbers used by various countries and locations;

DETAILED DESCRIPTION OF THE PREFERRED EMBODIMENT

Figure 1:
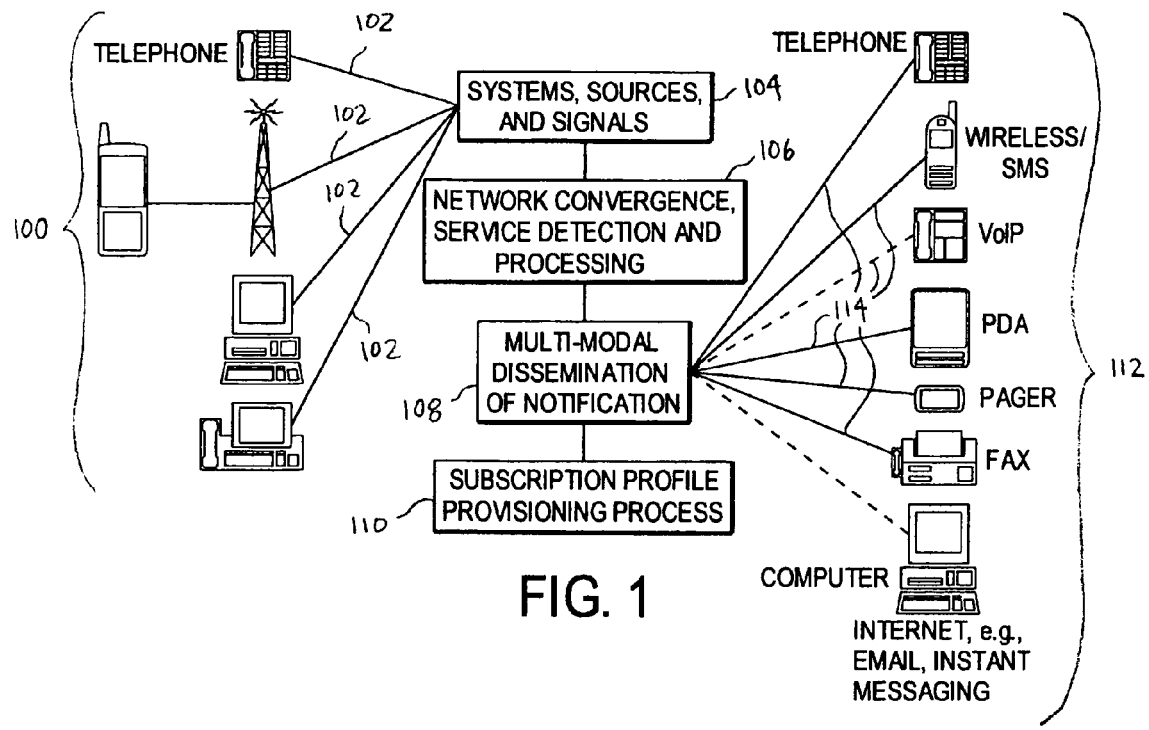
FIG. 1 is a drawing depicting a schematic of the main system architecture of a preferred embodiment of the present invention reflecting the relationship between high-level system components.

Several preferred embodiments of the invention are described for illustrative purposes, it being understood that the invention may be embodied in other forms not specifically shown in the drawings. In general, the embodiments may be presented through stand-alone systems located at one, few, or many sites, or through one, few, or many hosting sites that may be further linked through a master server or master notification server.

The present invention involves a method of distributing information to pre-selected or designated information recipients. It also involves a method of alerting those recipients of the fact that someone has initiated a call to a number of interest, including emergency numbers. The present invention also involves a method of maintaining a subscription service related to distributing information and alerting recipients when someone has initiated an emergency call.

In order to understand the functioning of the system, it is important to describe the major components and participants in the system, which are comprised of a network, users/subscribers of a service, and the pre-selected or designated information recipients of the notification portion of that service.

Referring now in detail to the drawings, FIG. 1 is a drawing depicting a schematic of the main system architecture of an embodiment of the present invention reflecting the relationship between the high-level system components. The communications system, which is described further in connection with other drawings in more detail, is reflected as a convergent system capable of multi-modal information gathering and dissemination. The main components of the invention are communications devices 100 used for receiving/gathering/collecting information. Those communications devices 100 are in data communication with a subsystem 104 by way of connected and/or interconnected networks 102. The subsystem 104 is in data communication with subsystem 106. On the dissemination side of the communications system, a multi-modal information dissemination subsystem 108 is in data communication with subsystem 106 and is connected or interconnected through networks 114 to communications devices 112. The subsystem 108 is in data communication with subsystem 110.

Subscribers to the system/service can be one or more of the following (which is not an exhaustive list): an individual, a community unit (a family, group, association/organization comprising a community unit), an enterprise, or unit of government at any level. A subscriber is one of the above persons or entities that wishes to use the invention under a fee-based, free, or other type or combination of subscription service agreement. Under a preferred embodiment of the invention, all calls received would be those from subscribers. Alternatively, a variety of triggers could be used for comparison with a database to identify any caller using an emergency reporting and response resource to determine if the number placing the call belongs to a subscriber.

Pre-selected or designated information recipients of the notification portion of the preferred embodiment of the invention, and subsequent application as a service—generally referred to as the subscriber support group in the case of individuals—could include individuals, community units, enterprises, and governments at any level. The support group may consist of one or more family members, friends, neighbors, personal doctors, care givers, assistants, etc. Additionally, those recipients could include communication devices and combinations of devices and the aforementioned entities. It may consist of colleagues, supervisors, building superintendents, or office manager(s). The support group may be a corporation that the subscriber works for, or a monitoring company that performs the alertment service for the subscriber, an insurer, car rental company that rents a car to the subscriber, or any other entity or group of entities. In general, those support groups would be pre-designated to receive critical information—such as the use of the emergency reporting and response system. Further, under certain circumstances, those and other recipients, may be designated on-the-fly to receive essential or significant information—all portions forming a part of vital communications connectivity.

Subscribers, pre-selected or designated information recipients, and other users (non-subscribers) of the communications system shown in FIG. 1 operate the communications devices 100, 112, which may be, but are not limited to, the devices illustrated and described in FIG. 1.

Figure 2:
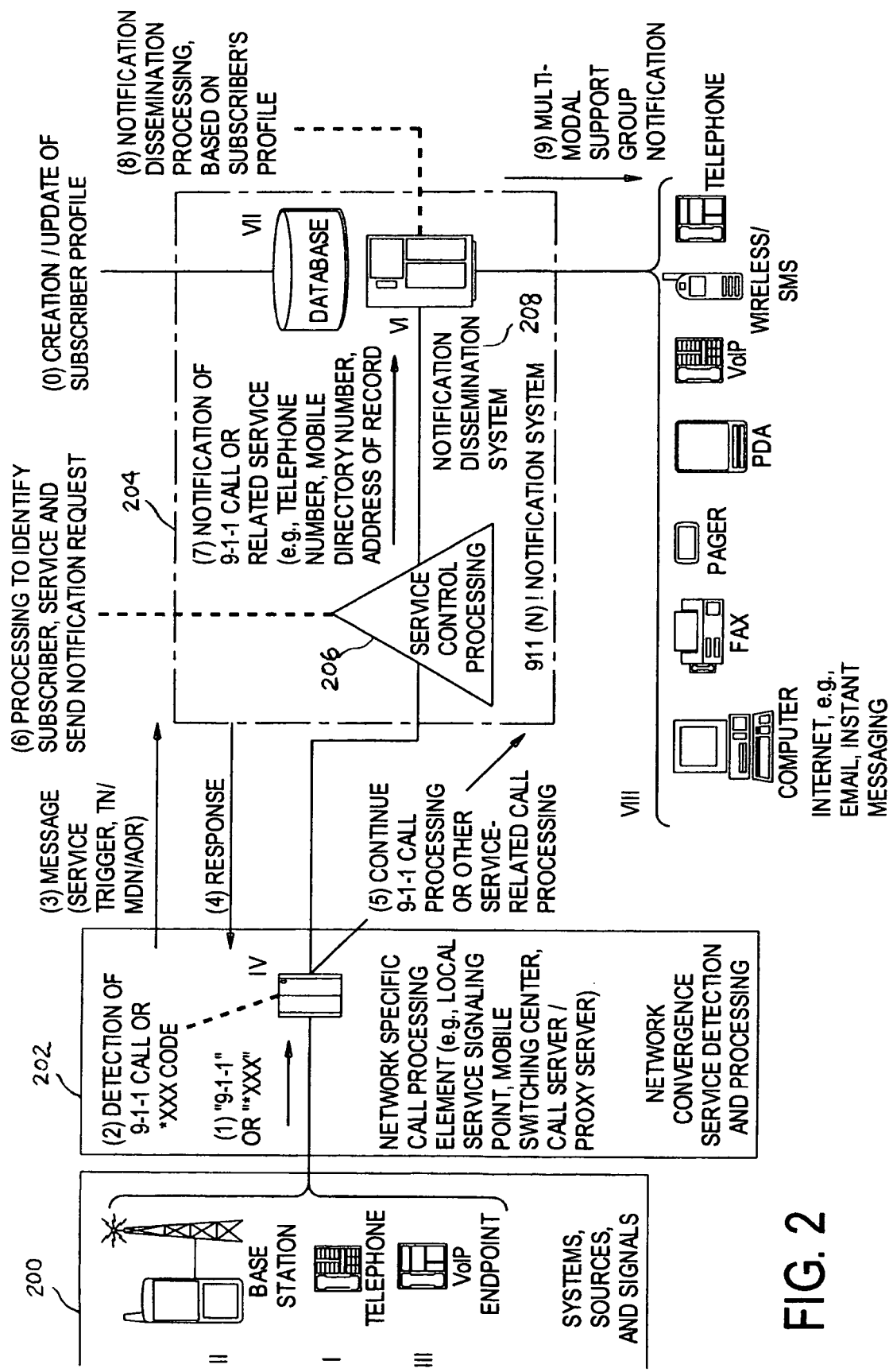
FIG. 2 is a drawing depicting a schematic of the system architecture of an embodiment of the present invention reflecting the convergence of originating telephone systems (wireline, wireless, and VoIP), notification system, and multi-modal dissemination systems.

FIG. 2 is a drawing depicting a schematic of the system architecture of an embodiment of the present invention reflecting the convergence of originating telephone system and signal notification sources 200—i.e., wireline (I), wireless (II), and VoIP (III) devices—and multi-modal dissemination systems (VIII), which may include, but is not limited to, any communications device as shown in the figure.

The schematic of FIG. 2 depicts the network and notification system elements that form the central element of an embodiment of the invention. The network is interconnected to various other communications networks via one or more circuit-switched or packet-switched networks. As noted previously in connection with FIG. 1, the central elements of the invention are those portions of the overall system that sense initiating signals, those portions that process and transmit those signals, and those portions that utilize those processed signals to initiate the multi-modal dissemination of information and notification by the system according to various protocols.

Within the general architecture of FIG. 2, wireline (I), wireless (II), VoIP (III), and other communication devices will provide initiation of notification through standardized methods and provisions as illustrated by subsystem 202. Such methods and provisions include the AIN of conventional telephony, Wireless Intelligent Network (and parallels) of wireless systems (which may be based upon a variety of operating systems), the call server/proxy processing (operating parameters of VoIP), and through system-independent initiation, which is not based upon the foregoing, but will utilize the same convergence of communications systems to achieve dissemination of information through one, few, or many notification systems. Subsystem 202 will include, for example, server (IV), which can be a computer-controlled telephony trunk or signal router in the form of a single server or multiple connected servers (e.g., a first server, second server, and third server) and is/are connected to a specific call processing element (not shown; the type depending on the type of network used). The notification subsystem 204 will consist of at least a service control processing point device 206 and associated software, a notification dissemination system 208, which includes at least one server (VI) connected to or associated with a subscriber database (VII).

Signal sensors will permit identification of the use of discrete identification codes or telephone numbers of interest, including those directed toward services provided by emergency response resources, and accept special codes to initiate notification for other purposes.

Each of the actions of sensing, processing, and transmitting will be paralleled within wireline, portable wireline, wireless, and VoIP communicator devices and possible combinations of those systems and devices. In the general classes of communication addressed thus far, the process, from the perspective of the subscriber, is quite similar. However the manner in which the various communicator devices initiate emergency telephone calls or send communications signals varies in significant ways and are further addressed in subsequent sections and with reference to detailed drawings. In general, those activities take place across circuit-switched and packet-switched networks.

Circuit-switching generally refers to a communications networking technology that provides a dedicated data connection between two communicator devices (e.g., telephones) regardless of the number of circuit switching devices the data are routed through. Packet-switching generally refers to a communications networking technology that breaks up a signal into discrete packets for transmission, each of which is addressed to a destination, and then dynamically switches or routes the packets to the destination over the same or different paths to a communicator device (e.g., a client or server computer) where they are reassembled back into their proper sequence.

Still with reference to FIG. 2, depending on the initiating source system (wireline (I), wireless (II), or VoIP (III) telephonic communications systems), the signal utilized to initiate the processing of the multi-modal dissemination system will make use of existing signaling network architectures and signaling mechanisms (e.g., SS7, AIN or Wireless Intelligent Network, or similar, signaling) or be IP enabled (part of a packet-switched network). In essence, under this preferred embodiment, regardless of where, how, through what means a telephone call originates, how the dissemination trigger is initiated, or how or through what means that trigger is received, upon receipt of that function-controlling signal, the multi-modal dissemination of notifications will be IP enabled. In the latter case, that trigger may be relayed to one, few, or many additional multi-modal dissemination systems to provide further notification coverage.

Table 1 below presents the sources of initiation along with the minimum amount of functionality that will be provided at the critical level of notification, keeping in mind that notification of essential and significant-level information is also a part of the vital connectivity of the overall system. The matrix reflects system sources as wireline (I), wireless (II), VoIP (III), hybrid systems (e.g., cable connection to the PSTN), and system independent notification through the use of dialing codes (e.g., the use of Star Codes). In general, these conditions are reflected in the table. A brief explanation follows, with more detailed descriptions provided in connection with the respective detailed drawings.

TABLE 1

| Call Placed/ Source System | 911 | Non-notification/ Good Samaritan | Critical Support Group Notification | Alternate Number Notification | Status Inquiry | Test Circuit |
|---|---|---|---|---|---|---|
| Wireline | X | X | X | X | X | X |
| Wireless | X | X | X | X | X | X |
| VoIP | X | X | X | X | X | X |
| Hybrid | X | X | X | X | X | X |
| System-independent notification | X | X | X | X | X | — |

All systems would be able to automatically detect the utilization of the emergency reporting and response system—through various triggers and methods discussed in connection with respective detailed drawings—to initiate notification of critical information, that pertaining to emergencies. Additionally, through the use of a special star code (*NNN) independent notification could be achieved through local switch manipulation as a part of the carrier's dialing plan or use of various forms of Intelligent Network processing.

In an effort to eliminate additional calls to the emergency reporting and response system when, for instance, a call is placed on behalf of someone else and there is no desire or requirement for the support group to be notified (i.e., the Good Samaritan call), then non-notification would be accomplished. That non-notification is contemplated to be accomplished through the use of a Star Code that will cause a normal 9-1-1 call to be initiated, but will inhibit the initiation of notification. Other methods for achieving the same result are also contemplated.

Alternate number notification will enable members of the support group, or other interested individuals or entities with appropriate authorization, to provide critical, essential, or significant-level notification to various pre-selected or designated information recipients on behalf of a subscriber. That function will be enabled through the use of a star code or a special local or long-distance number in connection with appropriate security access features.

The status inquiry feature will permit subscribers—or individuals or entities designated by subscribers—to access a subscriber account to determine the status of alertments that may have been initiated and to obtain other data regarding the performance of the notification system as it relates to the subscriber.

In order to test the system and ensure that there is no inadvertent initiation of a call to any emergency resource, the preferred embodiment includes a test circuit that will exercise all levels of the notification system by notifying pre-selected or designated information recipients of the test of the system.

All notifications will be accomplished in the broadest, multi-modal manner possible and will include notification via the communicator devices (VIII) illustrated in FIG. 2, which include, but are not limited to, wireline, wireless, and VoIP telephony, PDAs, pagers, SMS, IM, fax, Internet site, and e-mail, each of which may also include embedded video and audio files.

In addition to the relationships depicted in Table 1, each of the applications can be provided on a stand-alone or a hosted basis. In the case of stand-alone systems, in general, those systems would provide notification from and for the central offices of telecommunications carriers. Those systems could provide notification for only the reference office or for other central offices belonging to respective carriers. Under this embodiment, individual carriers could provide receipt, processing, and multi-modal dissemination services for other carriers.

Additionally, hosted systems can provide notification services for one, few, or many central offices/carriers and may, similarly, consist of one, few, or many sites to provide hosting services on a local regional, national, or international basis—the logical extension of which would be one source to achieve global notification on a nearly instantaneous basis.

Regardless of the manner in which the applications are provided—stand-alone or hosted—the notification end of the service will be similar in nature as depicted in the drawings. The multi-modal dissemination/notification subsystem 204 and recording portions (VII) of the system are common to all systems and may provide those functions for all systems, regardless of sources of initiating triggers of the notification process.

Still referring to FIG. 2, processing and storage of subscriber data regarding potential pre-selected or designated information recipients in database (VII) or databases associated with server (IV) will, at a minimum, consist of:

Pre-populated roster(s) of recipients—general emergency;

Pre-populated roster(s) of recipients—family/unit/organizational (group emergency communications planning—variants;

Pre-populated roster(s) of recipients—information services planning;

Pre-populated roster(s) of recipients (multiple)—for receipt of information on the fly;

Unpopulated roster(s) of recipients—for designation and notification on the fly; and Pre-populated roster(s) of recipients—for monitoring of disease states, diagnostic areas, physical and mental states.

The notification/dissemination system (VI) is a computerized system with a plurality of inputs and outputs for receiving and transmitting digital and analog signals. An interface, such as a Service Control Processing Point 206 or digital computer (not shown), may be used to control the notification/dissemination system (VI) and allow for accessing and manipulating the flow of electrical signals through the inputs/outputs. The notification/dissemination system (VI) may itself be a digital computer with all of the features of the notification/dissemination system (VI) built into the computer. As such, the notification/dissemination system (VI) will have one or more of, or some of, the following components: a microprocessor, power supply, uninterrupted power, storage media, memory, interface cards for telephony transmission lines (electrical and optical), electrical bus, keyboard or other interface, monitor, modem or other communications device, and software (described below). A notification and dissemination system could include an existing notification system, such as the Telcordia Notification System, available from Telcordia Technologies, Piscataway, N.J., (either as stand alone or hosting system), system available from a variety of other vendors, or by a combination of standardized hardware and software such as an appropriate rack-mounted processor running the Unwired Orchestrator software produced by Sybase, Inc., Dublin, Calif., in conjunction with a relational database or databases.

At least one database (VII) is connected directly to the notification/dissemination system (VI) (or it may be connected via the digital computer that is connected to the notification/dissemination system (VI) as noted above). The database (VII) is shown as a "subscriber database" or "recipient database" for illustrative purposes (i.e., other databases could also be connected to the notification/dissemination system (VI)). The database (VII) stores records associated with each subscriber using the present invention.

The dissemination devices (VIII) can be operated by one or more of the following (which is not an exhaustive list):

An individual,

A group of individuals,

An enterprise (i.e., corporation),

A group or association of entities,

A governmental agency,

A client computer; and

Any combination of the above.

The individuals, entities, and things listed above are pre-selected or designated by the subscriber to receive information and/or an alertment in the case the subscriber initiates an emergency telephone call by dialing a number such as 911. The support group may consist of one or more family members, friends, neighbors, personal doctors, care givers, assistants, etc. It may consist of colleagues, supervisors, building superintendents, or office managers. The support group may be a corporation that the subscriber works for, or a monitoring company that performs the alertment service for the subscriber, an insurer, car rental company that rents a car to the subscriber, or any other entity or group of entities. As noted previously, information relevant to those pre-selected or designated information recipients may be maintained in the database (VII).

A preferred embodiment of the system aspect of the invention will include the generation of an AIN, WIN (or similar) message, or an XML message file, depending on the type of originating call processing by the server (IV), as a result of the initiation of a telephone call to 911, or to a telephone call to any other discrete number. That message will trigger the notification software that will disseminate the message in the form required by each notification medium and/or communicator device (VIII). As a result of that detection, the message file will be forwarded to the notification/dissemination system (VI) or stand-alone processor that will interface with a database to extract the pre-selected or designated information recipients records and the modality of that notification. Subsequently, the message file, tailored to meet the requirements of the subscriber or information recipient, will be transmitted to the recipient. Upon delivery to the recipient, depending upon the communication modality, a record will be created for historical purposes with regard to delivery.

Figure 2A:
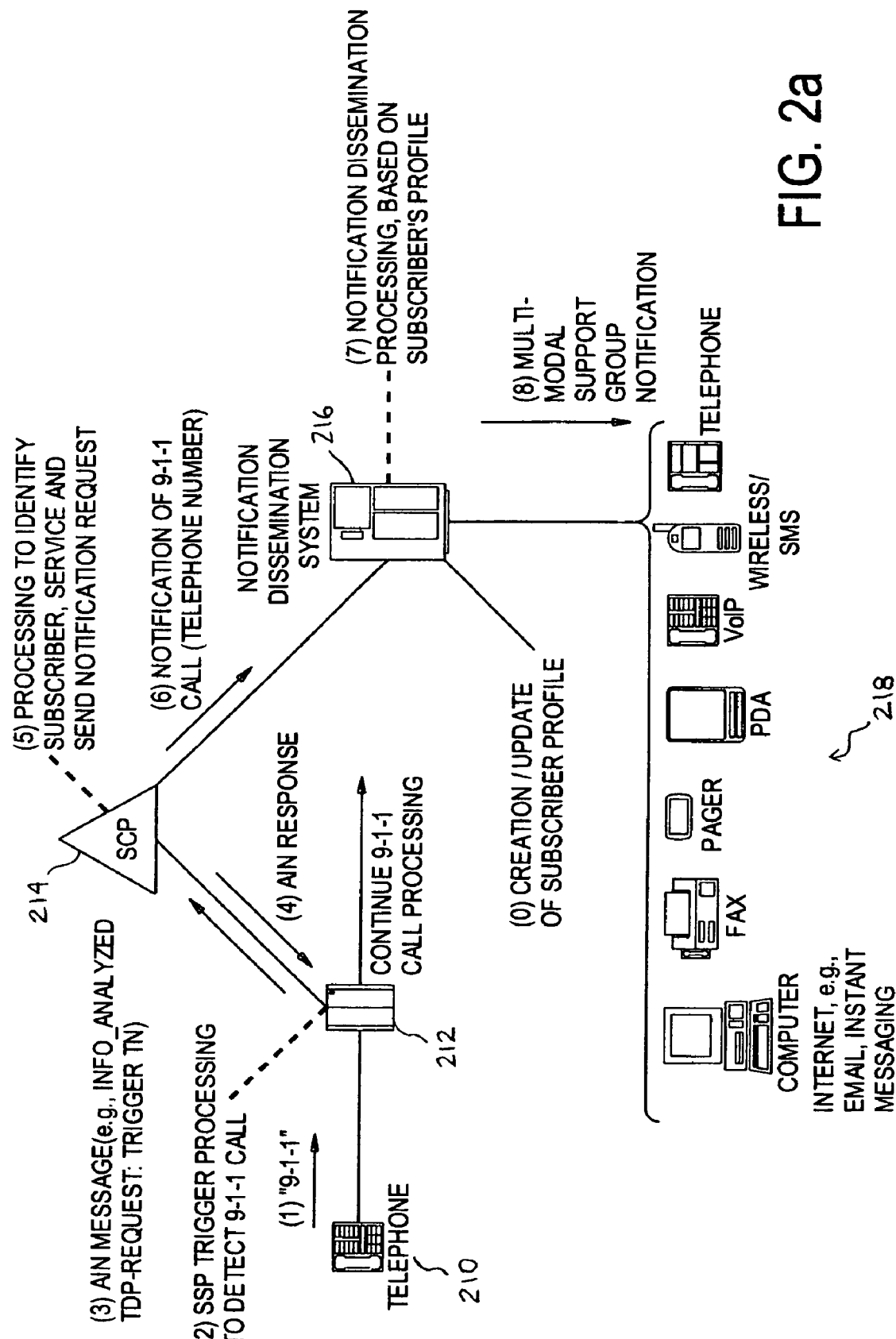
FIG. 2*a* is a drawing depicting a schematic of the system architecture of an embodiment of the present invention reflecting only the conventional wireline telephony portion of the system plus associated processing and multi-modal notification system.

FIG. 2*a* reflects a subsystem of the invention that is relevant to understanding of the functioning of the system to support activity with conventional wireline telephony. In FIG. 2*a*, the source of the signal is a wireline phone 210. The 9-1-1 call or *XXX code detection is provided at a local switch 212 equipped as an AIN SSP. At the SSP, a 9-1-1 call may be detected using an AIN trigger, such as the N11 trigger. A *XXX code may be detected with another trigger used for detecting service codes, e.g., a Public Service Code trigger. Upon detection of the trigger, the SSP sends an AIN-appropriate AIN message, such as an AIN Info_Analyzed message containing the dialed digits and including the Telephone Number (TN) of the caller. An AIN Service Control Point (SCP, hosted or stand-alone) 214 sends an immediate response (such as an AIN Continue message) to cause the 9-1-1 (or other call) to continue processing normally. The AIN SCP sends a message to the notification/dissemination system 216 identifying the type of service and the TN of the subscriber. The notification/dissemination system 216 disseminates the notifications to the pre-selected or designated information recipients identified in the subscriber's profile in the associated database by way of communication devices 218.

Figure 2B:
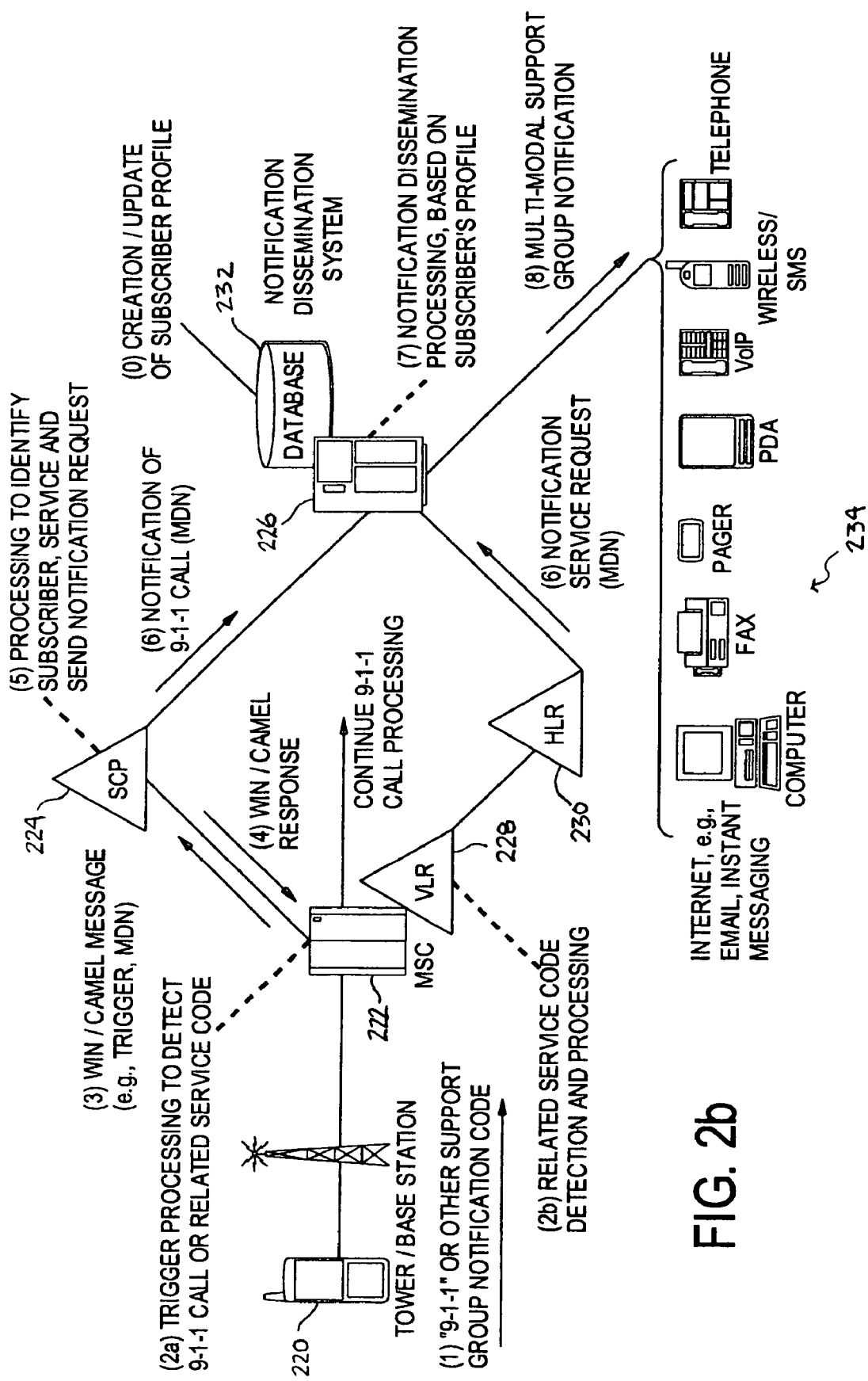
FIG. 2*b* is a drawing depicting a schematic of the system architecture of an embodiment of the present invention reflecting only the wireless telephony portion of the system plus associated processing and multi-modal notification system.

FIG. 2b reflects a subsystem of the invention that is relevant to understanding of the functioning of the system to support activity with several versions of wireless telephony. In FIG. 2b, the source of the signal is a wireless phone 220, personal digital assistant or other wireless device. The 9-1-1 call detection is provided at a the Mobile Switching Center (MSC) 222 equipped with Wireless Intelligent Network capabilities (or similar). At the MSC 222, all calls may be subject to a WIN message, as in prepaid forms of service. Alternatively, a specific trigger (such as the WIN Locally_Allowed_Specific_Digit_String message trigger) may be used to detect the dialed digits "9-1-1." Upon detection of the trigger, the SSP sends an appropriate WIN (or similar) message, such as a WIN Origination_Request message, containing the dialed digits and including the Mobile Directory Number (MDN) of the caller. An AIN Service Control Point (SCP, hosted or stand-alone) 224 sends an immediate response (such as an AIN Continue message) to cause the 9-1-1 (or other call) to continue processing normally. The AIN SCP sends a message to the notification/dissemination system 226 identifying the type of service as a 9-1-1 call and including the MDN of the caller. In the case of a *XX code, the Visited Location Register (VLR) 228 and Home Location Register (HLR) 230 may be involved in detecting the dialed *XX code and sending an appropriate message to the notification system. The notification/dissemination system 226 disseminates the notifications to the recipients identified in the subscriber's profile in the associated database by way of the by way of communication devices 234.

Figure 2C:
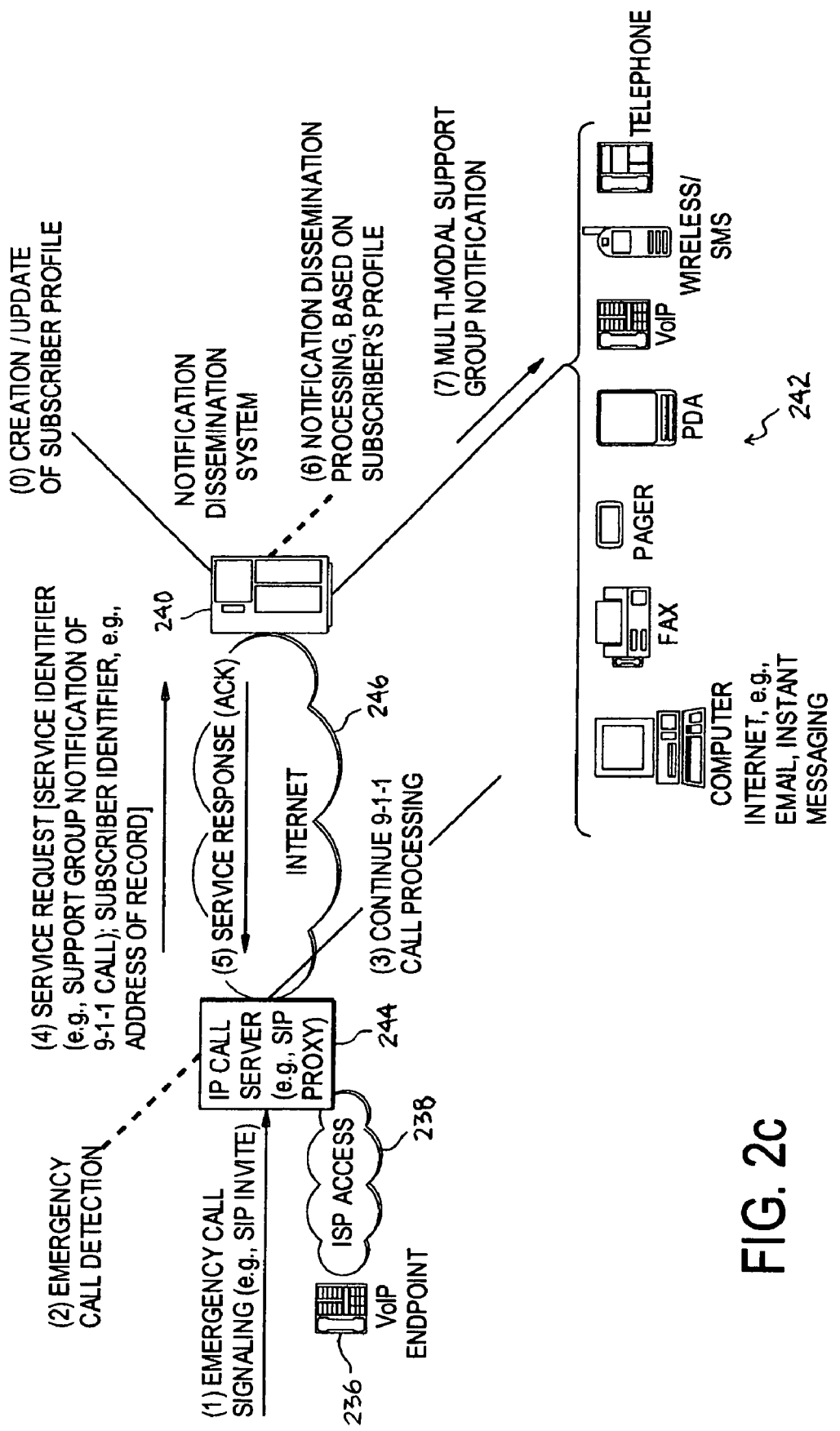
FIG. 2*c* is a drawing depicting a schematic of the system architecture of an embodiment of the present invention reflecting only the VoIP telephony portion of the system plus associated processing and multi-modal notification system.

FIG. 2c reflects a subsystem of the invention that is relevant to understanding of the functioning of the system to support activity with voice-over-internet (VoIP) telephony. In this subsystem, a VoIP endpoint 236 operating within a IP Service Provider call server or proxy 244 may be involved in the detection and routing of 9-1-1 calls and/or the detection of special service requests. When a 9-1-1 call or related service request is detected, the call server/proxy sends a message (e.g., a remote procedure call containing an XML message file) via the Internet 246 to the notification/dissemination system 240, including information to identify the type of request and an identifier for the VoIP caller, e.g., an Address of Record (AOR). The notification server associates the AOR with a subscriber profile and disseminates the appropriate notification to the subscriber's support group(s) by way of communication devices 242.

Figure 2D:
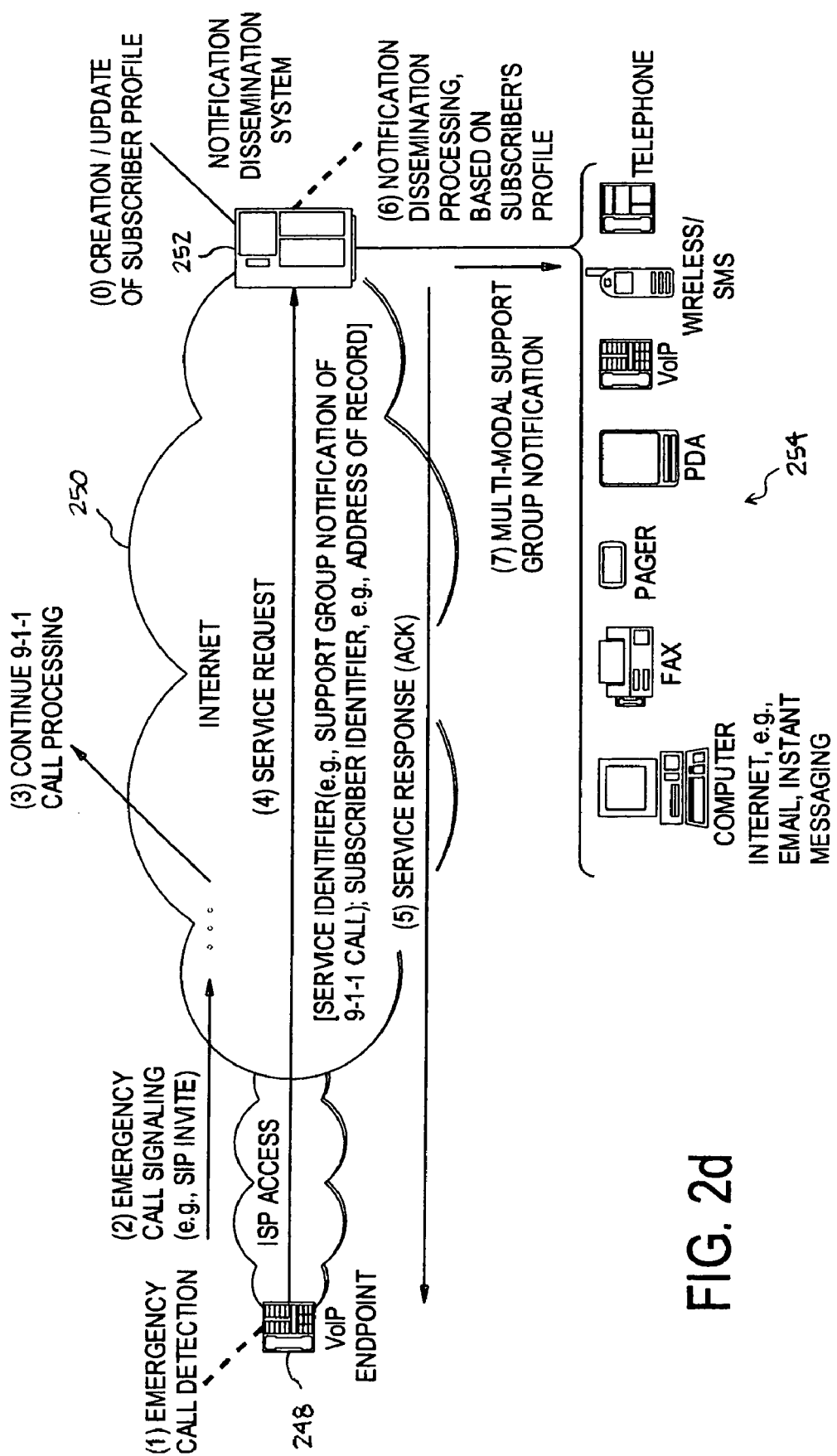
FIG. 2*d* is a drawing depicting a schematic of the system architecture of an embodiment of the present invention reflecting only the VoIP telephony portion of the system without a service provider plus associated processing and multi-modal notification system.

FIG. 2d reflects a subsystem of the invention that is relevant to understanding of the functioning of the system to support activity with VoIP telephony, where a VoIP Service Provider is not assumed. In this subsystem, the VoIP endpoint device 248 detects the service request (9-1-1 call or other related service request) and sends a message (e.g., a remote procedure call containing an XML message file) via the Internet 250 directly to the notification/dissemination system 252, including information to identify the type of request and an identifier for the VoIP caller, e.g., an AOR. The notification server associates the AOR with a subscriber profile and disseminates the appropriate notification to the subscriber's support group(s) by way of communication devices 254.

FIG. 3 is a drawing of a lookup table 300 showing a subset of the universal emergency telephone numbers used by various countries and locations that can be used by the subscribers of the present invention to produce a signal that is detectable by the sensor systems of the present invention as described above.

Figure 4:
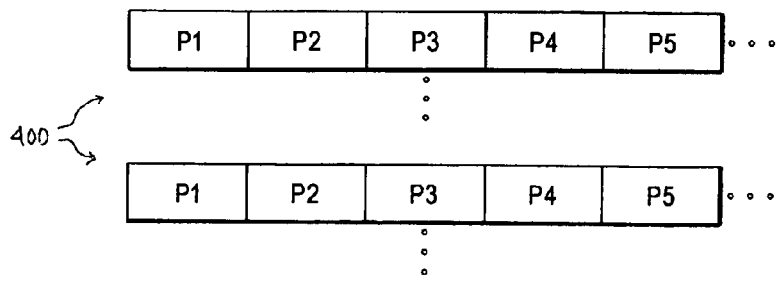
FIG. 4 is a drawing depicting a schematic of a digital signal transmitted in a packet-switched network.

FIG. 4 is a simplified drawing depicting a schematic of a plurality of digital signals 400 transmitted in a packet-switched network. An information file created by the notification system is formatted as discrete packets P1, P2, P3, etc., as shown in FIG. 4, each of which is coded so that the packets can be recreated in the correct sequence at the other end of the communications path. Each packet may contain, for example and without limitation, text, video, and/or audio data.

The information that is distributed to a subscriber's pre-selected or designated recipients is limited by the device used by the recipient to receive the information (e.g., a PDA, pager, mobile phone, etc.). Information may be distributed as data packets that form SMS text messages, IM messages, electronic mail, web pages, downloadable files, and the like (which may include embedded or separate audio, video, and/or text). The notification system will also include a computer-generated voice synthesizer (not shown) for generating digital audio files that can be transmitted over a specific communications path.

The pre-selected or designated information recipient communications devices described above and shown on FIGS. 2-2d represents the device that a recipient may use to access a web page, his or her e-mail or voice mail to receive information about the subscriber after an alertment protocol is executed. Where a wireless device is used to receive information from the notification system, it may need to be configured with software (which can be downloaded) that allows the notification system to "wake up" the device over a wireless network. To accomplish that functionality, the notification system may need to obtain the location of the wireless device at any given time. Such location data may be obtained from the user's wireless service carrier or wireless service provider, or it may be maintained by the notification system if the location information is provided.

A computer-implemented software program will control the flow of information into and out of the system, as well as storing data records associated with that information. Such a system can be centrally located on a single computer or distributed to multiple computers in data communication with each other.

Figure 5:
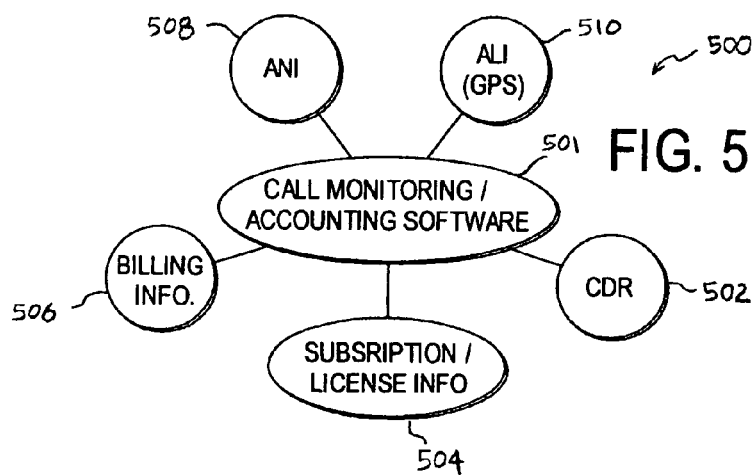
FIG. 5 is a drawing depicting the various information inputs used by the software of the present invention.

Turning now to FIG. 5, shown therein is a drawing depicting the various information inputs used by the software 500 of the present invention, which could be loaded and executed on the notification/dissemination systems identified previously (or, more specifically, the computer associated with the notification/dissemination systems identified previously). The software module 501 may also operate the notification system and other components of the system. In one aspect of the preferred embodiment, the software module 501 includes all of the programming needed to set up subscriber accounts and track usage terms and conditions, monitor emergency call usage information, monitor general subscriber calling usage, handle billing, receive and store location information, and execute alertment routines (among other functions not specifically mentioned). Those programming routines are designated elements 502 through 510 in FIG. 5, which is not a comprehensive list of routines. The software module 501 may include modules for translating information signals from one form to another, and logic modules for, among other things, translating text from one language to another, translating audio information into textual information (or vice versa: i.e., translating text to audio).

The software module 501 may be best implemented (and in some cases operated by) a communications company that has a large customer base and operates an existing telephony infrastructure that provides service to tied to the PSTN, a wireless network, a private local switch network, a VoIP (or hybrid) system provider, or combination of the above networks and providers. Under a preferred embodiment of the invention, for example in the case of automatic notification of the use of emergency reporting and response system, all of the triggers—and subsequent notification and reporting—from all of the calls placed throughout the entire United States in one year could be accommodated through a hosted system.

In the case of stand alone systems, very little hardware would be required to implement the invention. For instance, if a subscriber to the service was also a customer of the communications company (i.e., the communications company provided the subscriber with his or her local and/or long-distance phone service), the company would already house the system control hardware and software that would provide alertments/triggers when a subscriber places a call to the emergency response and reporting system, because the call originated with the company's phone system, and could simply execute the alertment protocol. In some cases, wireless service providers would also be able to provide automatic location data for the wireless device.

Because the subscriber may not know when a pre-selected or designated information recipient has changed his or her telephone number or other contact address information (e.g., electronic mail address), the software module 501 may regularly request updates/confirmation of contact information from recipients (or subscribers) and provide validity/non-validity reports to subscribers and update the databases previously identified.

Figure 6:
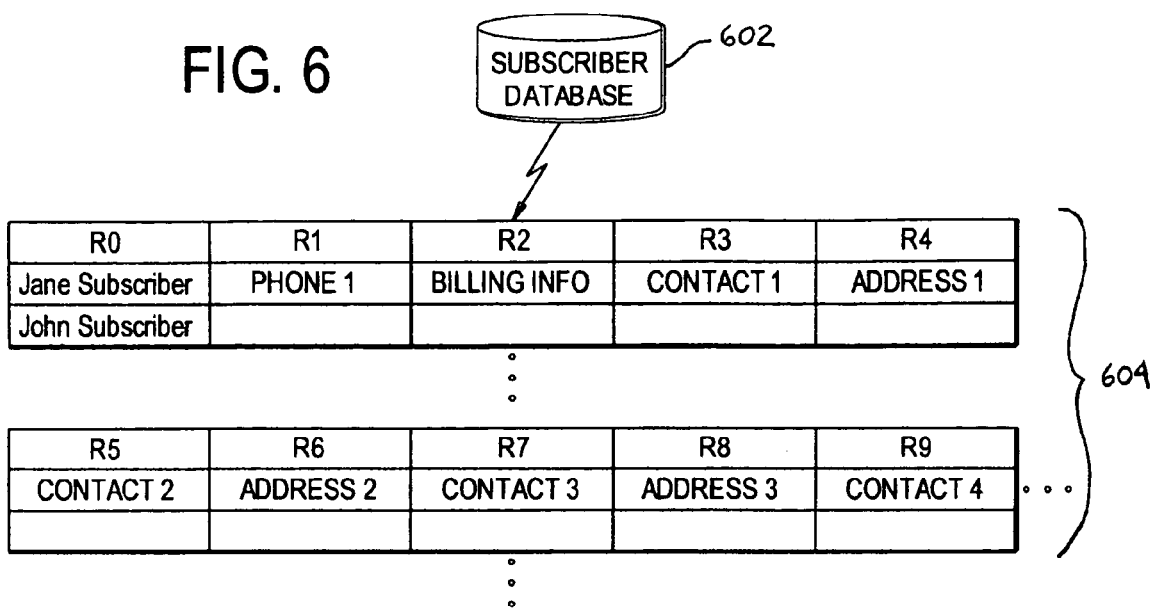
FIG. 6 is a drawing depicting a partial data structure of a subscriber database according to the preferred embodiment of the present invention.

Turning now to FIG. 6, shown therein is a drawing depicting a partial data structure 604 of a subscriber database 602 according to an embodiment of the present invention. The database 602 will include a data structure 604 in the form of, for example, a relational database having a plurality of records associated with each subscriber. Each subscriber will have one or more of the following record entries, which are provided for illustrative purposes only and do encompass all possible data entries that may be used:

R0: a subscriber identification code (e.g., "Jane Subscriber" or "John Subscriber");
R1: a subscriber contact code (e.g., "Phone 1"), which is the subscriber's phone number;
R2: a billing code (e.g., type of subscription, address, etc.);
R3, R5, etc., which are recipient contact codes representing contact names to be included in the subscriber's pre-selected or designated information recipient list; and
R4, R6, etc., which are a plurality of pre-selected or designated information recipient identifier codes (i.e., telephone numbers or addresses, including electronic mail and web-site addresses);

Other records may also be included in the database 602 which are not specifically shown in FIG. 6. In particular, the database 602 may contain records that form the basis for an alertment protocol that is executed by a software routine executed by the notification/dissemination system (or the computer associated with the notification/dissemination system). Those records are created by a subscriber who selects various options from a menu of options shown on a web page distributed over the Internet as a hypertext markup language (HTML) (or other appropriate markup language) file that is displayed on a client computer (not shown). For example, the menu of options may include any one of the following (which is not an exhaustive list):

The pre-selected or designated information recipients without regard to priority since all recipients will be notified simultaneously and by whatever method(s) chosen
Time periods during which the alertment protocol is to be executed (e.g., 1 hour, 10 hours, 1 week, etc., after the subscriber initiates an emergency telephone call);
Whether the subscriber name is to be provided to pre-selected or designated information recipients (currently null);
Whether the subscriber's phone number is to be provided to pre-selected or designated information recipients;
Whether the subscriber's current location is to be provided to pre-selected or designated information recipients (currently null);
Whether specific medical records are to be provided (currently null);
Whether secret codes are to be provided (currently null);
Whether allergy information is to be provided (currently null);
Whether the names of other information recipients are to be provided (currently null);
Other menu options are also contemplated but not listed here.

The present invention involves a method of distributing information to pre-selected or designated information recipients. It also involves a method of alerting those recipients of the fact that someone has initiated a call to an emergency number. The present invention also involves a method of maintaining a subscription service related to distributing information and alerting recipients when someone has initiated an emergency call.

The physical manifestations of the features of the present invention that would permit the identification of the use of discrete identification codes or telephone numbers of interest, including those directed toward services provided by emergency response resources, may be classified into four distinct processes that are comprised of, but not limited to:

Sensing (i.e., signal origination/detection of multi-modal communications initiation);
Transmission of electronic signals;
Processing of the same; and
Multi-modal dissemination of information according to a protocol.

Each one of those actions, which are best illustrated in FIGS. 2-2*d*, is currently paralleled within the realms of wireline, portable wireline, wireless, and VoIP communicator devices and possible combinations of those systems and devices. In the general classes of communications addressed thus far, the process, from the perspective of the subscriber or user, is quite similar. However the manner in which the various communicator devices initiate emergency telephone calls or send communications signals varies in significant ways as previously described. For example, in the case of a conventional wireline telephone, the process, in general, involves:

Switchhook activation;
Dial tone commences;
Keypad depression;
Dial tone cessation;
Call connection;
Conversation (non-applicable emanations); and
Switchhook termination.

In the case of the portable wireline phone (cordless phone), the process is slightly different:

Switchhook activation;
RF interface with base station;
Dial tone commences;
Keypad depression;
RF transmission to base station;
Call connection;
Conversation (non-applicable emanations); and
Switchhook termination.

In the case of the wireless (cellular) phone, the process is:
RF interface with corresponding cellular transceiver;

Keypad depression and number packet creation;
Number packet transmission via RF to cell transceiver;
Call connection;
Conversation (non-applicable emanations); and
Switchhook termination.

In the case of VoIP, the process appears the same to the subscriber, but the process is remarkably different for the IP systems as they provide direct notification of the system through Internet- or web-enabled means without ever transmitting data over the PSTN. Therefore a variety of means, other than those available for the other communications devices, are available for web-enabled systems. In general, the process appears to be the same from the perspective of the subscriber, including:

Switchhook activation;
Keypad depression;
Digital addressable packet transmission pursuant to the Internet protocol (IP);
Call connection;
Conversation; and
Switchhook termination.

A preferred embodiment of the invention will include the generation of an extensible markup language (e.g., XML) message file as a result of the initiation of a telephone call to 911, or to a telephone call to any other discrete number as described previously. That message file will trigger the notification software that will disseminate the message file in the form required by each notification medium and/or communicator device. As a result of that detection, the message file will be forwarded to a stand-alone processor that will interface with a database to extract the pre-selected or designated information recipients records and the modality of that notification. Subsequently, the message file, tailored to meet the requirements of the subscriber or information recipient, will be transmitted to the recipient. Upon delivery to the recipient, depending upon the communication modality, a record will be created for historical purposes with regard to delivery.

Figure 7A:
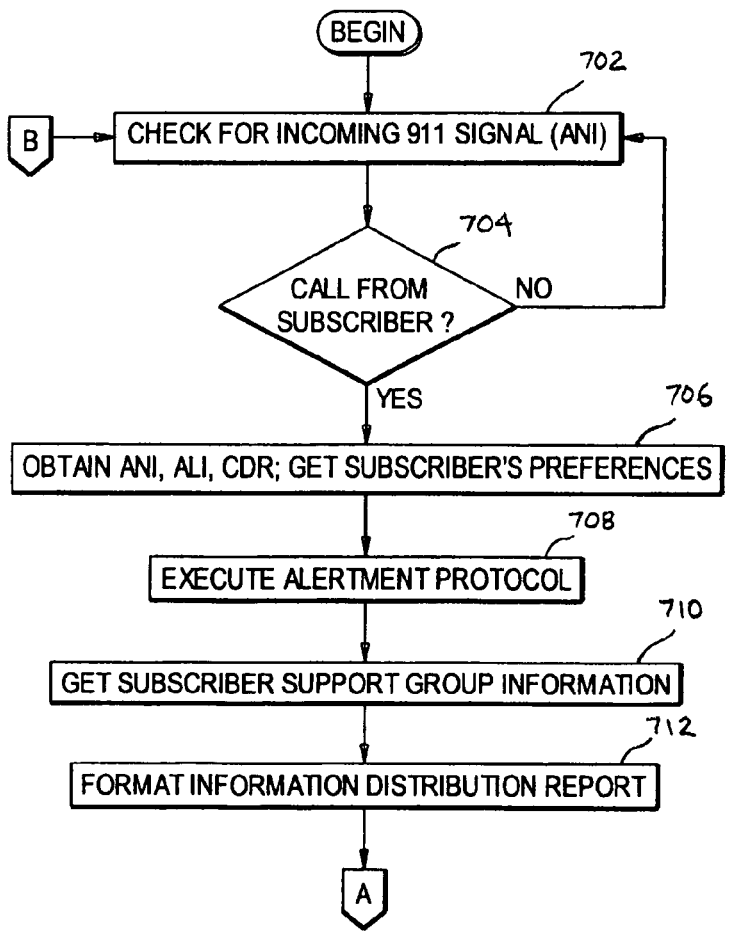
FIG. 7*a* is a process flow diagram of a method of using the present invention.

Turning now to FIG. 7a, shown therein is a process flow diagram describing a simplified method of using the present invention. In step 702, the information the notification/dissemination system continuously monitors for emergency telephone calls being initiated. Preferably, this is done by checking for triggers from the system controllers of wireline, wireless, VoIP or hybrid system communications system operators.

In step 704, the software module 501 (see FIG. 5) compares the received information to the records stored in the subscriber database 602 to identify the subscriber telephone that initiated the trigger—for whatever reason. (In other embodiments, the system will first verify that the initiating telephone is a subscriber to the service and the process will continue). In those instances where all public users of the system have access to the system without paying a subscription fee, the process step of checking whether the individual has subscribed is skipped.

In step 706, the software module 501 collects information about the subscriber that initiated the trigger, and it collects information about the call itself. ANI-type information may be obtained along with location (ALI) information. The software module 501 also identifies the subscriber's preferences, which are stored as a record in the database 602.

In step 708, the information collected by the software module 501 is processed and used as input data for the alertment protocol routine. The alertment protocol routine computes the nearest street address from the ALI information (i.e, converts latitude, longitude coordinates into a form that can be used to look up a street address). The alertment protocol routine determines whether it is appropriate to distribute information immediately to pre-selected or designated information recipients or if such alertment is to be postponed for a pre-selected amount of time based on the subscriber's preferences. The alertment protocol routine identifies pre-recorded audio files that may have been designated by the subscriber for distribution to the information recipients. The alertment protocol routine computes whether an alertment is to be made before the emergency call is completed or after the call is terminated.

In step 710, the subscriber's pre-selected or designated information recipients are identified in the records of the database 602 and passed to variables in the alertment protocol routine.

Depending on the subscriber's preferences and pre-selected or designated information recipient's capabilities, the software module 501 prepares one or more information distribution reports to be communicated to the information recipients. The report will be encoded or formatted appropriately for the destination device. For example, if the report is an e-mail message, the data are formatted according to the simple mail transfer protocol (SMTP) (or similar protocol). If the report is destined for a wireless device, the data are formatted according to an SMS protocol, or even a multimedia messaging service MMS protocol (or similar protocols). If the report is a web page, the data are formatted into a markup language file (i.e., HTML, XML, XHTML, and/or other standard or proprietary markup language). If the report is a data file that is to be transferred directly to the recipient's computer (e.g., a computer-generated audio file), the data are formatted according to a file transfer protocol. In step 712, the appropriate format is selected and the information distribution report is generated.

Figure 7B:
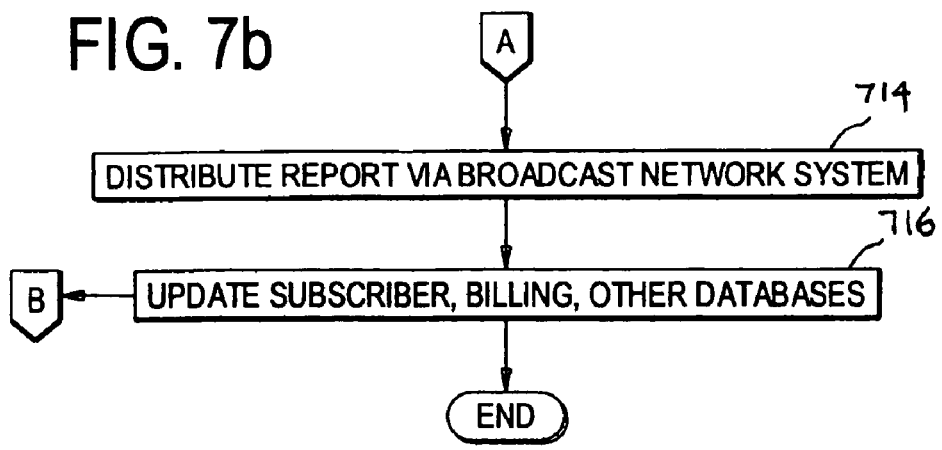
FIG. 7*b* is a continuation of the process flow diagram shown in FIG. 7*a;*

In process step 714 shown in FIG. 7b, the formatted information report is distributed via the notification system using push and/or pull technology. In push technology, the information distribution reports are automatically delivered to the pre-selected or designated recipients at a prescribed interval or based on the subscriber's preferences as described above. In pull technology, the recipient must specifically request the information distribution report beyond that provided in the initial notification, if available.

There may be instances when a third party would like to know when an individual's communicator device has initiated a telephone call to certain discrete communications addresses (e.g., specific telephone numbers) as an indication of some other matter of interest to the third party. In those cases, where the third party has subscribed to the service and received appropriate consent from the individual initiating the telephone call, the information distribution report is distributed via the notification system to the third party.

In step 716, the subscriber database 602 records are updated to reflect the status of the alertment protocol and the distribution of information to the pre-selected or designated information recipients.

In some instances, such as the use of the emergency notification system, initiating a communications connection by, for example, dialing a specific emergency number may be for the benefit of another and not for the individual placing the telephone call. In those instances, a method exists for canceling the automatic notification, as described previously, at the discretion of the caller or the subscriber.

Additionally, there may be instances in which an individual is involved in an emergency that would normally require placement of a call to emergency services notification and dispatch operations and that call has been placed on behalf of the subscriber, the members of whose support network have not been notified. In such cases, an alternative path to the notification system is provided to ensure that others are notified, regardless of the efficiency or effectiveness of the emergency reporting system.

Figure 8:
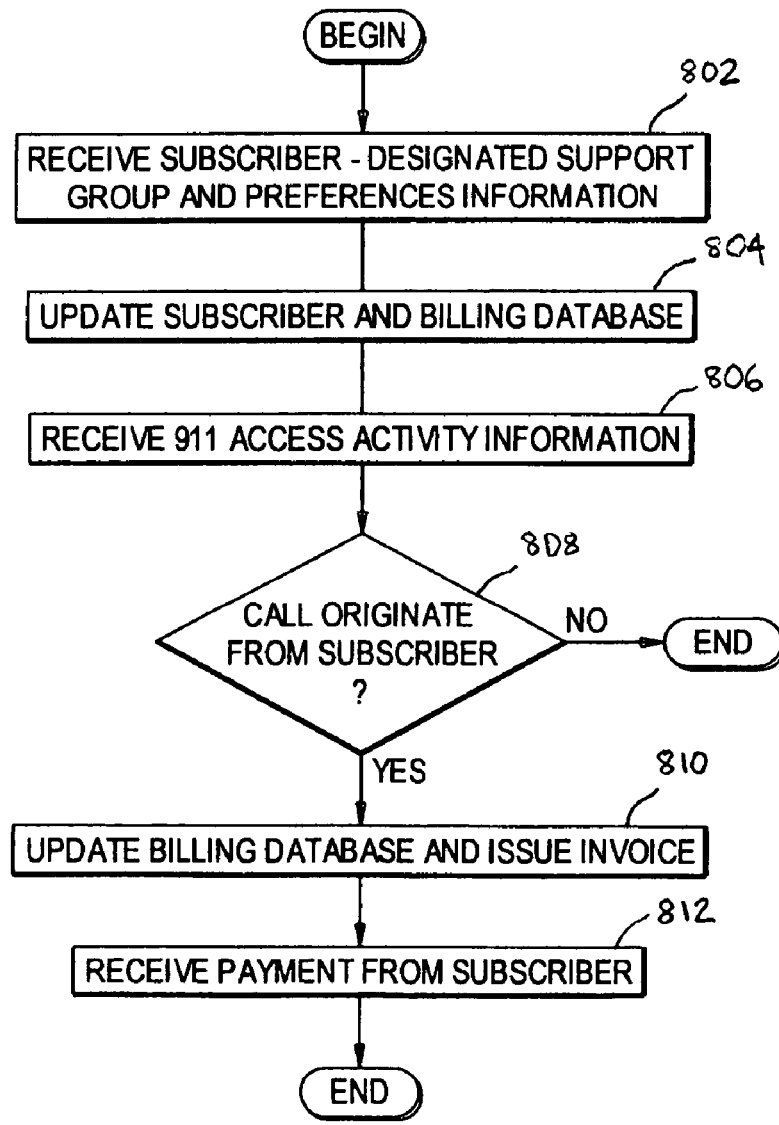
FIG. 8 is process flow diagram of a simple billing routine according to the present invention.

FIG. 8 is a process flow diagram of a simple billing routine according to the present invention. In step 802, the subscriber—or members of the subscriber support group—visits a web site using a client computer and enters into a subscription service agreement, which allows the subscriber to access a form for entering subscriber preferences. Using the form, the subscriber enters his or her preferences and identifies each person, entity, or thing that, collectively, make up his or her support group. The subscriber may also access that system by sending e-mail, through an interactive voice response system, or by completing a form and mailing it to a designated address.

In step 804, the subscriber's data are stored as record entries in one or more databases, such as subscriber database 602, which may include a billing database or billing records as discussed previously.

In step 806, the subscriber database 602 is updated to reflect any usage of the alertment system.

In step 808, the software determines whether a subscriber originated a triggering event and initiated the communications/notification system portion of the invention. If so, the subscriber's account is updated in step 810 to reflect additional charges and an invoice is issued (no invoice or charges would be incurred for subscribers operating under a subscription agreement where there is no cost or a flat rate cost for using the services).

In step 812, payment from the subscriber is received and recorded. One of ordinary skill in the art will appreciate that there are many variances on the aforementioned subscription-based billing routine. The sequence of steps identified above and shown in FIG. 8 are, therefore, for illustrative purposes only.

Although certain presently preferred embodiments of the disclosed invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

I claim:

1. A communications system for collecting, processing, and transmitting information signals over communications networks originating within the same or different communications networks, the communications system comprising:

trigger decision means for determining whether to develop, identify, or utilize triggers related to a receipt of information received within a first communications network by automatically monitoring simultaneously for the receipt of information about an initiation of at least one emergency response system parameter and the receipt of information about an initiation of at least one independent user-initiated action parameter, and then for determining whether to initiate at least one of family, community unit, enterprise, and government emergency communications plan based on the receipt of the information thus received, wherein the communications plan includes an alertment protocol for each of a plurality of users, and wherein the alertment protocol for each of the plurality of users includes an identity of a plurality of information recipients and a user-provided time period value when the alertment protocol is to be executed following the receipt of the information;

database means for storing the alertment protocols, and information related to the triggers, the plurality of users and the plurality of information recipients; and notification means responsive to the receipt of the information for transmitting multi-modal signals simultaneously over one or more different communications networks, one of which may be the first communications network, based on the alertment protocol to each of the identified plurality of recipients, wherein the signals contain at least information related to the triggers.

2. The communication system of claim 1, wherein the triggering means comprises a communications device and a code for causing the communications device to produce a trigger.

3. The communication system of claim 2, wherein the trigger caused by using the code with the communications device causes the automatic notification of the plurality of recipients according to a notification plan.

4. The communications system of claim 2, wherein the communications device comprises at least one of a conventional wireline telephone, a wireless telephone, a voice-over-internet telephone, a hybrid telephone, and a personal emergency notification device, and wherein the personal notification device comprises a notification station in data communication with the trigger receiving means.

5. The communication system of claim 2, wherein the transmitted multi-modal signals are transmitted to at least two or more of wireline telephones, wireless telephones, voice-over-internet telephones, servers, client computers, personal digital assistants, pagers, fax machines, short message service-enabled devices, instant messaging-enabled devices, other e-mail-based devices, and any combination of those devices using one or more data communications protocols.

6. The communication system of claim 1, wherein each of the plurality of users and the plurality of information recipients comprises at least one of individuals, groups of individuals, communities, entities, governments, and a computer.

7. The communication system of claim 1, further comprising:

monitoring means for monitoring the first communications networks for the presence of the trigger.

8. The communication system of claim 1, wherein the multi-modal dissemination of information includes at least one of embedded video, data, and audio files.

9. The communication system of claim 1, further comprising:

subscription means for receiving payment from the plurality of users who use the communications system.

10. The communications system of claim 1, wherein the triggers and multi-modal signals are delivered over at least one of an advanced intelligent network, wireless intelligent network, and Internet Protocol network.

11. The communications system of claim 1, wherein said trigger decision means and said notification means each comprise a distributed system of stand-alone communications switches or hosting sites.

12. The communications system of claim 1, wherein the notification means comprises at least one of wireline, wireless, voice-over-internet telephony, and hybrid communications networks.

13. The communications system of claim 1, further comprising:

location means for locating a geographical location of the user.

14. A method for distributing alertment information to a plurality of information recipient over one or more communications networks, the method comprising the steps of:

detecting when a triggering event has been initiated by a user by automatically monitoring simultaneously for the receipt of information about the initiation of at least one emergency response system parameter and the receipt of information about the initiation of at least one independent user-initiated action parameter;

determining whether to develop, identify, or utilize a trigger based upon the detected triggering event and whether to initiate at least one of family, community unit, enterprise, and government emergency communications plan, wherein the communications plan including an alertment protocol for the users, and wherein the alertment protocol for the user includes an identity of a plurality of information recipients and a user-provided time period value when the alertment protocol is to be executed following the receipt of the information;

receiving information about the user or a communicator device associated with the user that caused the triggering event;

formatting a report containing information received about at least one of the triggering event, the user, and the communicator device; and transmitting the report as a multi-modal signal simultaneously to at least some of the plurality of information recipients pre-selected by the user prior to the detection of a trigger event.

15. The method of claim 14, further comprising the step of initiating, by the user, a communication that causes the triggering event, wherein the step of initiating comprises entering a code in a communicator device.

16. The method of claim 14, wherein the multi-modal signal is compatible with at least one of a wireline phone, a wireless phone, a voice over Internet Protocol phone, a personal data assistant, a pager, and wherein the multi-modal signal is formatted as at least one of a short message service, instant messaging, e-mail, fax, extensible markup language code file, audio file, and video file message.

17. The method of claim 14, further comprising the step of identifying the geographical location of at least one of the user and the communicator device.

18. The method of claim 17, wherein the multi-modal signal includes information about at least one of the geographical location of the user and the communicator device.

19. A communications system for collecting, processing, and transmitting information signals over communications networks originating within the same or different communications networks, the communications system comprising:

a first server for determining whether to develop, identify, utilize or transmit a first trigger signal related to calls initiated by one or more users within a wireline telephony network by monitoring automatically and simultaneously for a receipt of at least one emergency response system parameter and a receipt of at least one independent user-initiated action parameter, and for determining whether to initiate at least one of family, community unit, enterprise, and government emergency communications plan, wherein the communications plan includes an alertment protocol for each of a plurality of users, and wherein the alertment protocol for each of the plurality of users includes an identity of a plurality of information recipients and a user-provided time period value when the alertment protocol is to be executed following the receipt of the emergency response system parameter and the independent user-initiated action parameter;

a second server for developing, identifying, utilizing and/or transmitting a second trigger signal related to calls initiated by one or more users within a wireless telephony network;

a third server for developing, identifying, utilizing and/or transmitting a third trigger signal related to calls initiated by one or more users within voice over Internet Protocol telephony network;

a service control processing point device in data communication with the first three servers adapted to transmitting information regarding the triggering signals;

a notification server in data communication with at least one of the first, second, and third servers for simultaneously outputting multi-modal notification signals; and a subscriber database containing a plurality of subscriber profiles, wherein each of the subscriber profiles includes a subscriber identification code and at least one recipient identification code associated with a recipient communicator device.

20. The communication system of claim 19, wherein the trigger signals are used to initiate the outputting of the notification signals.

21. The communication system of claim 19, wherein each subscriber profile includes information about at least one of an individual user, group of individual users, a family unit, and organization, an enterprise, and a governmental unit.

22. The communication system of claim 19, wherein the communicator device is at least one of a wired device, a wireless device, and a VoIP device.

23. The communication system of claim 19, wherein the triggering signals are generated upon receipt by the communicator device of an emergency reporting code.

24. The communication system of claim 23, further comprising means for preventing the outputting of the multi-modal notification signals and transmitting of information regarding the triggering signal.

25. The communication system of claim 23, further comprising means for outputting of the multi-modal notification signals and preventing transmitting of information regarding the triggering signal.

26. The communication system of claim 19, wherein the triggering signals are identified and the notification signals are outputted in near real time.

27. The communication system of claim 19, wherein the outputted notification signals includes a report.

28. The communication system of claim 19, wherein the trigger signals are formatted as extensible markup language files.

29. The communication system of claim 28, wherein the extensible markup language files comprise information for causing the outputting of multi-modal notification signals compatible with different communications networks and communicator devices.

30. The communications system of claim 19, wherein the notification server includes at least one of a software module for converting speech-to-text, converting text-to-speech, and translating text or audio from one language to another.

31. The communications system of claim 19, wherein the notification signals contain at least one of text, audio, video, and multimedia information.

32. A communications system for transmitting over a communications network information signals related to the initiation of a telephone call to an emergency response system, the communications system comprising:

a subscriber database containing a plurality of subscriber profiles, wherein each of the subscriber profiles includes an alertment protocol comprising a subscriber identification code associated with a subscriber communicator device, at least one recipient identification code associated with a recipient communicator device, and a user-provided time period value when the alertment protocol is to be executed;

a first communications network for receiving a first electronic signal containing information about the initiation of a telephone call to an emergency response system and information about the initiation of an independent user-initiated action parameter, wherein the first electronic signal is generated by the subscriber communicator device;

a signal monitoring device adapted to automatically receive said first electronic signal and determine whether to develop, identify, or utilize the first electronic signal if said electronic signal is either an emergency response system parameter or an independent user-initiated action parameter and to compare said first electronic signal to the subscriber identification codes to generate a second electronic signal containing information about the subscriber and the telephone call to the emergency response system; and, a notification device adapted to receive said second electronic signal and transmit the same to the recipient communicator device based on the alertment protocol.

33. The communication system of claim 32, wherein the subscriber communicator device and the recipient communicator device are at least one of a wireline telephone, wireless telephone, VoIP telephone, a pager, a computer, a personal digital assistant, and a personal emergency notification device.

34. The communication system of claim 32, wherein the signal monitoring device and the notification device are independent of the 911 emergency reporting and response communications network system.

35. The communication system of claim 32, wherein the signal monitoring device executes an alertment software protocol comprising pre-planned and pre-selected scenarios to permit emergency communications planning.

36. The communications system of claim 32, wherein the signal monitoring device is also adapted to receiving an electronic signal containing information about a geographical location of the subscriber.

37. The communications system of claim 36, wherein the location information includes geographic coordinates.

38. The communications system of claim 36, wherein the location information is automatically transmitted to the signal monitoring device concurrently with the first electronic signal.

39. The communications system of claim 32, further comprising a telephone call data record created from said first electronic signal and stored in a memory.

40. The communications system of claim 32, wherein the signal monitoring device is a computer-controlled telephony trunk or signal router.

41. A subscription-based telephone service system operating in cooperation with an emergency telephone number system comprising:

a profile server accessible over one or more communications networks;

a plurality of subscriber profiles stored on the profile server, wherein each of the plurality of subscriber profiles includes at least a subscriber identification code associated with a subscriber communicator device and an alertment protocol including an identity of a recipient, at least one recipient identification code associated with a recipient communicator device, and a user-provided time period value when the alertment protocol is to be executed;

a telephone signal monitoring device adapted to automatically receive the subscriber identification code when a subscriber initiates a telephone call to an emergency telephone number system;

a decision subsystem adapted to determining whether to develop, identify, utilize, or forward to the telephone signal monitoring device at least one emergency response system parameter and at least one independent user-initiated action parameter by automatically and simultaneously monitoring for the receipt of information about both types of parameters;

a comparator subsystem adapted to compare the plurality of subscriber profiles to the subscriber identification code received by the telephone signal monitoring device; and an alertment subsystem adapted to format a digital message and transmit it to the recipient communicator device based on the alertment protocol.

42. The subscription-based telephone service system of claim 41, wherein said subscriber identification code is a first phone number and the recipient identification code is a second phone number.

43. The subscription-based telephone service system of claim 41, wherein the alertment subsystem comprises:

a server connected to the one or more communications networks; and an alertment protocol module.

44. The subscription-based telephone service system of claim 41, wherein the recipient communicator device is at least one of a wired telephone, a wireless telephone, a pager, a computer, a personal digital assistant, and a combination of the above.

* * * * *